United States Patent
Oenick et al.

(10) Patent No.: US 12,230,774 B2
(45) Date of Patent: Feb. 18, 2025

(54) MARINE BATTERY SAFETY SYSTEM AND METHOD

(71) Applicant: Brunswick Corporation, Mettawa, IL (US)

(72) Inventors: John N. Oenick, Madison, WI (US); Eric S. Mueller, Fond du Lac, WI (US); Steven J. Gonring, Slinger, WI (US); Trevor George, Savoy, IL (US)

(73) Assignee: Brunswick Corporation, Mettawa, IL (US)

( * ) Notice: Subject to any disclaimer, the term of this patent is extended or adjusted under 35 U.S.C. 154(b) by 161 days.

(21) Appl. No.: 17/716,745

(22) Filed: Apr. 8, 2022

(65) Prior Publication Data
US 2022/0328893 A1    Oct. 13, 2022

Related U.S. Application Data

(60) Provisional application No. 63/172,895, filed on Apr. 9, 2021.

(51) Int. Cl.
*H01M 10/48* (2006.01)
*B60L 3/00* (2019.01)
(Continued)

(52) U.S. Cl.
CPC ......... *H01M 10/486* (2013.01); *B60L 3/0046* (2013.01); *B60L 3/04* (2013.01);
(Continued)

(58) Field of Classification Search
CPC ............... H01M 10/486; H01M 10/63; H01M 10/6567; H01M 10/6568;
(Continued)

(56) References Cited

U.S. PATENT DOCUMENTS

| 5,876,872 A | 3/1999 | Feezor |
| 8,535,104 B1 * | 9/2013 | Nida ............... B63H 21/383 62/3.61 |

(Continued)

FOREIGN PATENT DOCUMENTS

| CN | 109860503 | 6/2019 |
| CN | 212695242 | 3/2021 |

(Continued)

OTHER PUBLICATIONS

Christian et al., DE 102015201580 A1 Espacenet machine translation, 2015 (Year: 2015).*

(Continued)

*Primary Examiner* — Adam A Arciero
(74) *Attorney, Agent, or Firm* — Andrus Intellectual Property Law, LLP

(57) ABSTRACT

A marine battery pack including an enclosure defining a cavity, a plurality of cell modules within the cavity, each comprising a plurality of battery cells, and at least one sensor configured to sense at least one of a temperature, a pressure, a presence of water, and a gas content within the cavity. A controller is configured to detect an event warranting decommission of the battery pack based on the temperature, the pressure, the presence of water, and/or the gas content within the cavity, and then to automatically operate a pump to intake water from outside of the enclosure and pump water through the cavity from an inlet port in the enclosure to an outlet port in the enclosure so as to cool the plurality of battery cells.

19 Claims, 13 Drawing Sheets

(51) Int. Cl.
  *B60L 3/04* (2006.01)
  *B60L 50/64* (2019.01)
  *B63B 79/10* (2020.01)
  *B63B 79/40* (2020.01)
  *H01M 10/0525* (2010.01)
  *H01M 10/625* (2014.01)
  *H01M 10/63* (2014.01)
  *H01M 10/6567* (2014.01)
  *H01M 50/24* (2021.01)
  *H01M 50/574* (2021.01)
  *H01M 50/636* (2021.01)

(52) U.S. Cl.
  CPC .............. *B60L 50/64* (2019.02); *B63B 79/10* (2020.01); *B63B 79/40* (2020.01); *H01M 10/482* (2013.01); *H01M 10/488* (2013.01); *H01M 10/625* (2015.04); *H01M 10/63* (2015.04); *H01M 10/6567* (2015.04); *H01M 50/24* (2021.01); *H01M 50/574* (2021.01); *H01M 50/636* (2021.01); *B60L 2200/32* (2013.01); *B60L 2240/545* (2013.01); *H01M 10/0525* (2013.01); *H01M 2200/00* (2013.01); *H01M 2220/20* (2013.01)

(58) Field of Classification Search
  CPC ........... H01M 50/574601; H01M 3/04; H01M 50/574; H01M 10/625; H01M 50/636; H01M 10/0525; H01M 2220/20; H01M 10/48; H01M 10/613; H01M 10/62; H01M 10/654; H01M 50/249; H01M 50/609; B60L 3/04; B60L 58/26; B60L 2240/36; B60L 2240/662; B60L 2250/10; B63H 21/17

See application file for complete search history.

(56) References Cited

U.S. PATENT DOCUMENTS

| | | | |
|---|---|---|---|
| 8,980,455 B2 | 3/2015 | Guo | |
| 9,099,760 B2 | 8/2015 | Lim et al. | |
| 9,153,800 B2 | 10/2015 | Jung | |
| 9,630,686 B2 | 4/2017 | Morash et al. | |
| 9,853,267 B2 | 12/2017 | Page et al. | |
| 10,096,863 B2 | 10/2018 | Hartmeyer et al. | |
| 10,622,682 B2 | 4/2020 | Brockman et al. | |
| 10,804,711 B2 | 10/2020 | Sheeks et al. | |
| 10,818,978 B2 | 10/2020 | Newman et al. | |
| 10,862,087 B2 | 12/2020 | Hartmeyer | |
| 10,991,923 B2 | 4/2021 | Cordani et al. | |
| 11,011,736 B2 | 5/2021 | Mack et al. | |
| 2006/0110657 A1* | 5/2006 | Stanton | H01M 10/121 429/96 |
| 2011/0045324 A1 | 2/2011 | Kritzer et al. | |
| 2012/0315514 A1 | 12/2012 | Guo | |
| 2013/0164567 A1 | 6/2013 | Olsson et al. | |
| 2013/0312947 A1* | 11/2013 | Bandhauer | H01M 10/6556 429/62 |
| 2015/0380782 A1 | 12/2015 | Youngs et al. | |
| 2017/0253142 A1 | 9/2017 | Buckhout | |
| 2017/0267319 A1 | 9/2017 | Morash et al. | |
| 2018/0013115 A1 | 1/2018 | Schmidtke | |
| 2018/0219266 A1 | 8/2018 | Hermann | |
| 2019/0168038 A1 | 6/2019 | Lian et al. | |
| 2020/0149989 A1 | 5/2020 | Jost et al. | |
| 2020/0251703 A1 | 8/2020 | Aldrich | |
| 2020/0266508 A1 | 8/2020 | Hjorteset | |
| 2020/0377186 A1 | 12/2020 | Thompson | |
| 2021/0143492 A1* | 5/2021 | Zagrodnik | H01M 10/647 |

FOREIGN PATENT DOCUMENTS

| | | | |
|---|---|---|---|
| DE | 102014006829 | 11/2015 | |
| DE | 102015201580 A1 * | 8/2016 | ............. B60L 58/26 |

OTHER PUBLICATIONS

International Search Report issued for PCT/US2022/024097, dated Jul. 28, 2022.
PCT/US2022/024099, International Search Report and Written Opinion dated Jul. 28, 2022.

\* cited by examiner

MARINE BATTERY SAFETY SYSTEM AND METHOD

CROSS-REFERENCE TO RELATED APPLICATION

This application claims priority to U.S. Provisional Patent Application No. 63/172,895, filed Apr. 9, 2021, which is incorporated herein by reference in its entirety.

FIELD

The present disclosure generally relates to marine power storage systems configured for a marine environment, and more particularly to li-ion battery systems configured for installation in a marine environment, such as high voltage battery systems configured for installation on a marine vessel to power electric marine propulsion devices and/or other loads on a marine vessel.

BACKGROUND

Battery packs configured to power marine vessel loads, such as configured to power electric marine propulsion devices, store large amounts of energy. These battery packs, such as lithium-ion (li-ion) battery packs, have high energy densities and are configured to deliver energy at high currents and voltages. The energy is often stored in smaller storage elements, such as battery cells or groups of battery cells, housed and electrically connected together in series to generate a high voltage output. These battery packs generally have external housings, or enclosures, configured to protect the battery cells and prevent water ingress and also to safely contain the high voltage storage elements.

One major risk with li-ion battery packs, in particular, is thermal runaway. Li-ion battery thermal runaway occurs when a battery cell, or area within the cell, achieves elevated temperatures due to thermal failure, mechanical failure, internal short-circuiting, or an electrochemical abnormality of a cell or within the pack. At elevated temperatures, exothermic decomposition of the cell materials begins. Eventually, the self-heating rate of the cell is greater than the rate at which heat can be dissipated to the surroundings, and the cell temperature rises exponentially causing a chain reaction of exothermic decomposition of surrounding cells. When this occurs, the thermal and electrochemical energy stored in the battery is released to the surroundings.

The following patents and patent publications are hereby incorporated by reference in their entireties:

U.S. Pat. No. 9,630,686 discloses a pressure tolerant energy system. The pressure tolerant energy system may comprise a pressure tolerant cavity and an energy system enclosed in the pressure tolerant cavity configured to provide electrical power to the vessel. The energy system may include one or more battery cells and a pressure tolerant programmable management circuit. The pressure tolerant cavity may be filled with an electrically-inert liquid, such as mineral oil. In some embodiments, the electrically-inert liquid may be kept at a positive pressure relative to a pressure external to the pressure tolerant cavity. The energy system may further comprise a pressure venting system configured to maintain the pressure inside the pressure tolerant cavity within a range of pressures. The pressure tolerant cavity may be sealed to prevent water ingress.

U.S. Pat. No. 8,980,455 discloses a lithium-ion battery with a gas-releasing and explosion-proof safety valve, which comprises a casing and a battery core. The casing includes an opening that is sealed by a thermal cover, on which a safety valve is disposed. The safety valve comprises a safety cover and a pressure filter. A middle portion of the safety cover includes a through hole. The pressure filter is affixed to the middle portion of the safety cover and has numerous pores. The safety cover and thermal cover are hooked together.

U.S. Patent Application No. 2018/0013115 discloses a method for housing a battery used on a light-weight, motor powered watercraft includes the step of: providing a battery case having: a pod sized to house a marine battery, the pod having a cavity for the marine battery and an open top; a lid for at least water-resistant closure of the open top of the pod, the lid having a cavity and an open bottom, the lid is releasably attachable to the pod; and a floor releasably attached to the lid adjacent the open bottom, the floor adapted to hold controls for the light-weight, motor powered watercraft.

SUMMARY

This Summary is provided to introduce a selection of concepts that are further described hereinbelow in the Detailed Description. This Summary is not intended to identify key or essential features of the claimed subject matter, nor is it intended to be used as an aid in limiting the scope of the claimed subject matter.

In one aspect of the present disclosure, a marine battery pack includes an enclosure defining a cavity, a plurality of cell modules within the cavity, each comprising a plurality of battery cells, and at least one sensor configured to sense at least one of a temperature, a pressure, a presence of water, and a gas content within the cavity. A controller is configured to detect an event warranting decommission of the battery pack based on the temperature, the pressure, the presence of water, and/or the gas content within the cavity, and then to automatically operate a pump to intake water from outside of the enclosure and pump water through the cavity from an inlet port in the enclosure to an outlet port in the enclosure so as to cool the plurality of battery cells.

In one example, the controller is configured to detect immersion of the enclosure prior to operating the pump.

In another example, the marine battery pack further comprises at least one exterior sensor configured to sense at least at least one of an exterior temperature, an exterior pressure, and a presence of water on the exterior of the enclosure, and the controller is configured to detect immersion of the enclosure based on the at least one of the exterior temperature, the exterior pressure, and the presence of water on the exterior of the enclosure.

In another example, at least one of the plurality of cell modules of the battery pack is configured to power the pump.

In another example, the marine battery pack further includes at least one power switch configured to selectively connect each of the plurality of cell modules to the pump so as to power the pump. For instance, the controller is further configured to control the at least one power switch based on a temperature of each of the plurality of cell modules so as to disconnect any cell module having a temperature that exceeds a threshold temperature.

In another example, the marine battery pack further includes at least one power switch to selectively connect at least two of the plurality of cell modules in parallel to power the pump.

In another example, the marine battery pack further includes a dedicated pump power source configured to power the pump. For instance, the dedicated pump power source is a low voltage battery housed within the cavity that is not connectable to the plurality of cell modules.

In another aspect of the present disclosure, a method of controlling a marine battery pack includes monitoring with a controller a temperature, a pressure, a presence of water, and/or a gas content within the cavity of an enclosure of the marine battery pack, and then detecting an event warranting decommission of the battery pack based on the temperature, the pressure, the presence of water, and/or a gas content within the cavity. Following detection of the event warranting decommission of the battery pack, a pump is automatically operated to intake water from outside of the enclosure and pump the water through the cavity from an inlet port in an enclosure to an outlet port in the enclosure so as to cool the plurality of battery cells.

In one example, the method further includes detecting immersion of the enclosure based on input from at least one exterior sensor on the enclosure prior to operating the pump to pump the water through the cavity. Optionally, detecting the immersion of the enclosure includes detecting, via the at least on exterior sensor, at least one of a presence of water on an exterior of the battery enclosure, a threshold exterior pressure, a threshold exterior pressure change, and a threshold exterior temperature change. Optionally, detecting the immersion of the enclosure includes detecting total immersion of the enclosure in water based on input from a plurality of external sensors prior to operating the pump to pump the water through the cavity.

In another example, detecting the event warranting decommission includes detecting immersion of the enclosure for a threshold period of time.

In another example, the method further includes operating at least one power switch with the controller to selectively connect at least one of a plurality of cell modules in the battery pack to the pump so as to power the pump. Optionally, the at least one power switch is controlled based on a temperature of each of the plurality of cell modules so as to disconnect any cell module having a temperature that exceeds a threshold temperature from powering the pump.

In one example, the method further includes controlling at least one power switch to selectively connect at least two of the plurality of cell modules in parallel to power the pump.

In another example, the method further includes, following detection of the event warranting decommission of the battery pack and prior to operating the pump, automatically operating at least one port opening element to open the inlet port of the enclosure or to open the outlet port of the enclosure.

In another aspect of the present disclosure, a marine battery pack includes an enclosure defining a cavity configured to protect against water ingress and a plurality of cell modules within the cavity, each comprising a plurality of battery cells. At least one sensor is configured to sense at least one of a temperature, a pressure, a presence of water, and a gas content within the cavity. A controller is configured to detect an event warranting decommission of the battery based on the temperature, the pressure, the presence of water, and/or the gas content within the cavity, and then to automatically operate a first port opening element to open at least a first port on a first side of the enclosure and a second port opening element to open at least a second port on a second side of the enclosure so as to permit water flow through the cavity between the first port and the second port when the enclosure is totally immersed in water.

In one example, at least one of the first port and the second port is configured to permit bidirectional flow of fluid into and out of the cavity.

In another example, each of the first port and the second port is configured to permit bidirectional flow of fluid into and out of the cavity.

In another example, at least one of the first port opening element and the second port opening element includes at least one of an electromechanical element and a pyrotechnic element configured to force an opening in the enclosure to open the first port and/or the second port.

In another example, at least one of the first port opening element and the second port opening element is a valve.

In another example, the marine battery back further includes a pump configured to intake water from outside the enclosure and pump the water through the cavity between the first port and the second port.

In another example, the marine battery back further includes at least one exterior sensor on the battery enclosure configured to sense at least one of an exterior temperature, an exterior pressure, and a presence of water on the exterior of the battery enclosure, and the controller is further configured to detect immersion of the enclosure in water based on input from the exterior sensor prior to operating the first port opening element and the second port opening element. Optionally, the controller is further configured to detect the immersion of the enclosure in water for a threshold period of time prior to operating the first port opening element and the second port opening element. Optionally, the controller is further configured to detect total immersion of the enclosure in water based on input from a plurality of external sensors prior to the first port opening element and the second port opening element.

In another example, the marine battery back further includes a first exterior sensor configured to sense water exposure on a first side of the enclosure and a second exterior sensor configured to sense water exposure on a second side of the enclosure, and wherein the controller is further configured to detect immersion of the enclosure in water based on input from at least the first and second exterior sensors prior to operating the first port opening element and the second port opening element.

In another example, the event warranting decommission includes at least one of a detected water ingress into the cavity and a detected thermal runaway of at least one of the plurality of cell modules.

In another example, the first port is on a lower half of the enclosure and the second port is on an upper half of the enclosure.

In another example, the first port is on a first lateral half of the enclosure and the second port is on a second lateral half of the enclosure.

In another example, the first side and the second side are opposing sides of the enclosure.

In another aspect of the present disclosure, a method of controlling a marine battery pack having an enclosure defining a cavity containing battery cells includes detecting, with a controller, immersion of the enclosure in water based on the input from at least one exterior sensor and monitoring a temperature, a pressure, a presence of water, and/or a gas content within the cavity to detect an event warranting decommission of the battery pack. Once an event warranting decommission of the battery pack is detected, a first port opening element may be automatically operated to open at least a first port on a first side of the enclosure and a second port opening element may be operated to open at least a second port on a second side of the enclosure so as to permit water flow through the cavity between the first port and the second port when the enclosure is totally immersed in water.

In one example, at least one of the first port opening element and the second port opening element is at least one of an electromechanical element and a pyrotechnic element configured to force an opening in the enclosure and operable by the controller to open the first port and/or the second port.

In another example, at least one of the first port opening element and the second port opening element is a valve operable by the controller to open the first port and/or the second port.

In another example, the method further includes controlling a pump to intake water from outside the enclosure and pump the water through the cavity between the first port and the second port so as to cool the plurality of battery cells.

In another example, the method further includes detecting immersion of the enclosure in water based on at least one of an exterior temperature, an exterior pressure, and a presence of water on the exterior of the battery enclosure prior to operating the first port opening element and the second port opening element.

In another example, the method further includes detecting the immersion of the enclosure in water for a threshold period of time prior to operating the first port opening element and the second port opening element.

In one aspect of the present disclosure, a marine battery pack has an enclosure defining a cavity and configured to protect against water ingress into the cavity and a plurality of battery cells in the cavity. The marine battery pack further includes a foam container containing a foaming agent, wherein the foam container is configured to release the foaming agent into the cavity in response to detection of an event warranting decommission.

In one example, the foam container is a pressurized container containing a liquid foam solution. Optionally, the pressurized container contains an inner cartridge containing an activation agent, wherein operating the foam container to release the foaming agent includes causing the inner cartridge to release the activation agent to mix with the foam solution and cause expulsion of the at least one foaming agent.

In another example, the foam container is configured to release the foaming agent over a period of time.

In another example, the foaming agent includes a chemical foaming agent.

In another example, the foaming agent is configured to generate an endothermic reaction upon the release into the cavity so as to cool the battery cells.

In another example, the foaming agent is configured to coat the exposed electrical conductors in the pack to prevent electrolysis following water ingress into the cavity.

In another example, the foaming agent is configured to remain a liquid when released into the cavity such that it can be flushed out of the cavity.

In another example, the marine battery pack includes an outlet port in the enclosure configured to permit the foaming agent to flow out of the cavity. Optionally, the outlet port contains a vent cover and is configured such that the vent cover is expelled by the foaming agent to open the outlet port.

In another example, the marine battery pack includes at least one sensor configured to sense at least one of a temperature, a pressure, a presence of water, and a gas content within the cavity, and a control module configured to detect an event warranting decommission of the battery pack based on the temperature, the pressure, the presence of water, and/or the gas content within the cavity and, upon detection of the event warranting decommission, to control the foam container to release the at least one foaming agent.

In one aspect of the present disclosure, a method of controlling a marine battery pack having an enclosure defining a cavity containing a plurality of battery cells includes sensing, with at least one interior sensor, at least one of a temperature, a pressure, a presence of water, and a gas content within the cavity and then detecting, with a controller, an event based on the temperature, the pressure, the presence of water, and/or the gas content within the cavity. In response to detecting the event, a foam container containing a foaming agent is operated to release the foaming agent into the cavity.

In one example, the event is an event warranting decommission of the battery pack. Optionally, the event warranting decommission of the battery pack is thermal runaway in at least a subset of the plurality of battery cells, and wherein detecting the thermal runaway includes determining that the temperature exceeds a temperature threshold.

In another example, the method includes operating the foam container to release the foaming agent over a period of time.

In another example, the foam container is a pressurized container containing a liquid foam solution. Optionally, the pressurized container contains an inner cartridge containing an activation agent, and wherein operating the foam container to release the foaming agent includes causing the inner cartridge to release the activation agent to mix with the foam solution and cause expulsion of the at least one foaming agent. Optionally, the pressurized container is controllable to release the foaming agent over a period of time.

In another example, the method further includes opening an outlet port in the enclosure to permit the foaming agent to flow out of the cavity.

In another example, the method further includes, after releasing the foaming agent into the cavity, operating a pump to pump water through the cavity to an outlet port.

Various other features, objects, and advantages of the invention will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
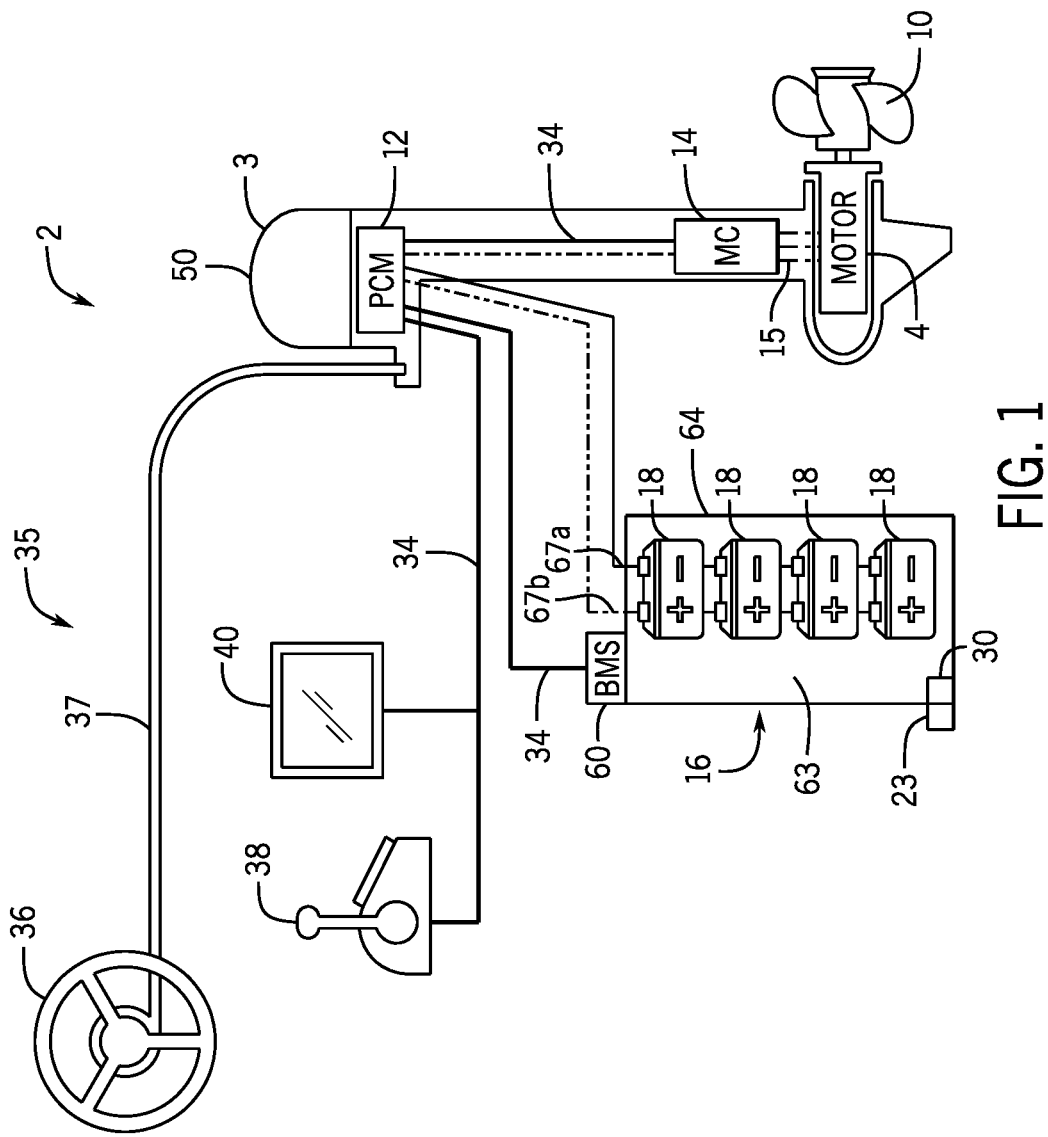
FIG. 1 is a diagram illustrating an exemplary electric marine propulsion system having a power storage system comprising a marine battery pack according to an exemplary implementation of the present disclosure.

Vehicle electrification and the application of electric marine propulsion systems and lithium-ion (li-ion) battery technology for electrical energy storage poses a different set of hazards than traditional internal combustion engines and liquid fuel storage. Additional hazards are created in the marine environment when li-ion batteries having liquid organic electrolytes come in contact with water. The inventors have recognized that particular issues may arise relating to battery conditions on marine vessels and other marine-related electrical energy storage with li-ion cells boaters on open water may not be able to reach a safe location in event of a battery fire or other hazardous battery event. Moreover, having the vessel surrounded by water, which is a conductor, creates a hazard that needs to be accounted for when a catastrophic battery event occurs. Thus, the inventors have recognized a need for a marine battery system and monitoring methods that provide detection and mitigation of potential hazards of a battery-driven electric marine propulsion system.

Upon recognition of the foregoing problems, the inventors developed the disclosed marine battery safety system that can detect and address the hazards of a li-ion battery energy storage system with special consideration to the hazards posed by water exposure, submersion, and the potential for water ingress into the high voltage system. The disclosed system and method are configured to monitor the marine power storage system, such as a battery pack on a marine vessel or on a dock, via multiple sensors and detect a hazardous condition that warrants further action. The system may include various external and/or internal sensors and sensing analysis methods to detect a water exposure event where the battery pack has been exposed to and/or immersed in water, and/or to detect when an event has occurred that warrants immediate decommissioning of the battery.

Upon detection of external water exposure, for example, the system is configured to automatically trigger a sequence of safety systems to address and mitigate various hazardous circumstances, such as electric shock. For example, the system may be configured to disconnect the high voltage battery from the vessel load and/or open connections within the pack to break down the battery into several smaller units to reduce the overall voltage of the battery, thus reducing the shock hazard. Upon detection of internal water exposure or a catastrophic event, for example, the system is configured to automatically trigger a sequence of safety systems to address and mitigate various hazardous circumstances, including thermal propagation, and/or electrolysis gas buildup inside the battery pack enclosure. Under certain conditions where, for example, a battery fire is imminent, the system may be configured to automatically decommission the battery pack in a way that maximizes heat dissipation and minimizes the buildup of electrolysis gasses inside the battery pack.

FIG. 1 depicts an embodiment of an electric marine propulsion system 2 powered by a power storage system 16, such as a Li-ion battery pack. In the depicted embodiment, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine propulsion devices, such as inboard drives, stern drives, jet drives, or the like. The exemplary electric marine drive 3 has an electric motor 4 configured to propel the marine vessel by rotating a propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator, as is well known in the relevant art.

The electric motor 4 is electrically connected to and powered by a power storage system 16. The power storage system 16 stores energy for powering the electric motor 4 and is rechargeable, such as by connection to shore power when the electric motor 4 is not in use. Various power storage systems 16 are known in the art and are suitable for powering an electric marine drive, such as various li-ion battery pack arrangements. In the depicted example, a bank or group of cell modules 18 is connected in series to provide a large voltage output. In one example, the high voltage power storage system 16 may include one or more li-ion battery packs of 250 V DC or more, such as 450 V DC, 550 V DC, or an even higher voltage pack such as 800 V DC.

The central controller 12, which in the depicted embodiment is a propulsion control module (PCM), communicates with the motor controller 14 via communication link 34, such as a CAN bus. The controller also receives input from and/or communicates with one or more user interface devices in a user interface system 35 via the communication link, which in some embodiments may be the same communication link as utilized for communication between the controllers 12, 14, 60 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. The user interface system 35 may also include a steering wheel 36, which in some embodiments may also communicate with the controller 12 to effectuate steering control over the marine drive 3, which is well-known and typically referred to as steer-by-wire arrangements. In the depicted embodiment, the steering wheel 36 is a manual steer arrangement where the steering wheel 36 is connected to a steering actuator that steers the marine drive 3 by a steering cable 37.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor. Sensors may be configured to sense the power, including the current and voltage, delivered to the motor 4. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38.

Figure 2:
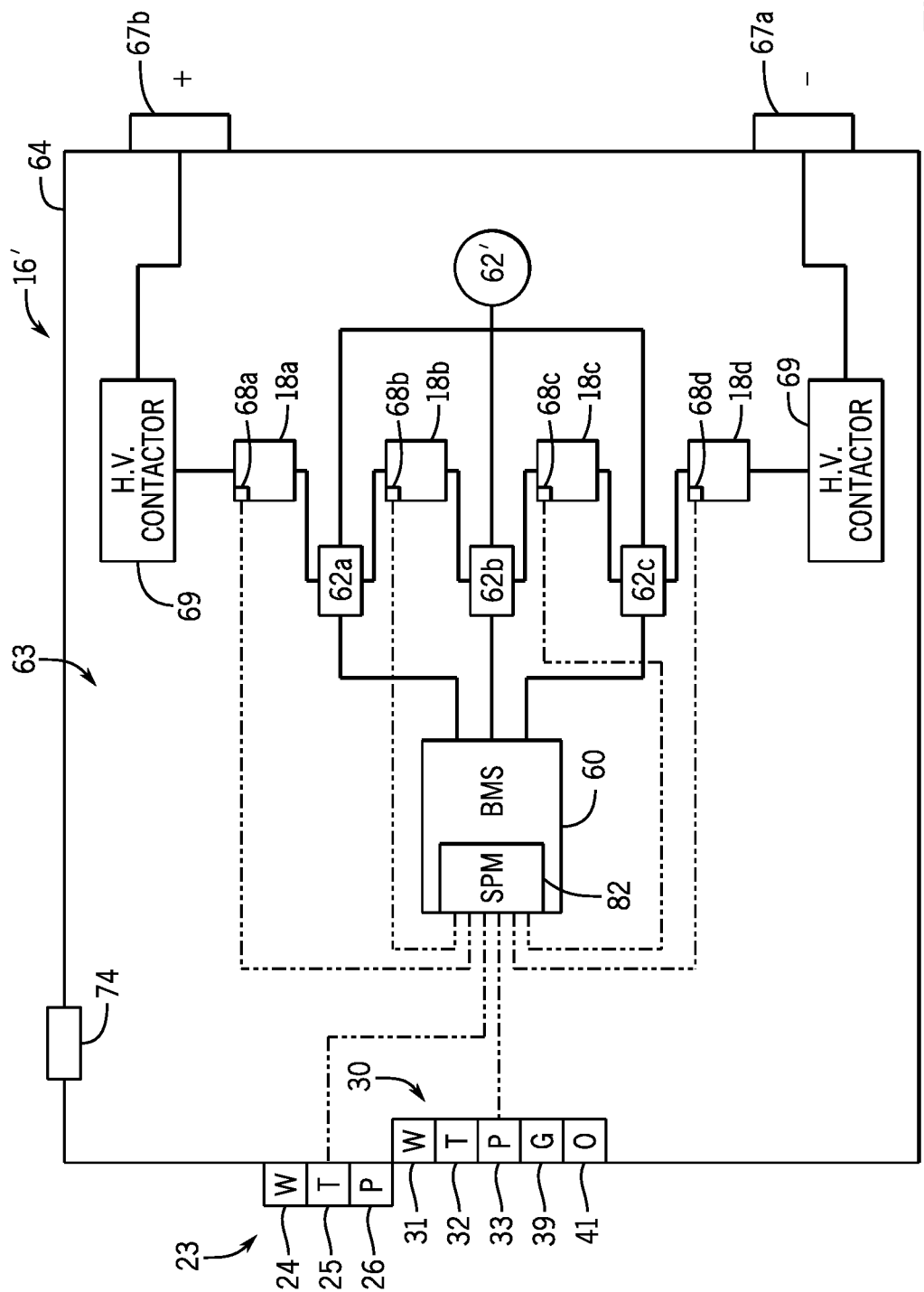
FIG. 2 is a diagram of a marine battery pack according to an embodiment of the present disclosure.

Referring also to FIG. 2, power storage system 16 may be a Li-ion battery pack 16' having an enclosure 64 defining a cavity 63. The power storage system 16 may further include a battery management system 60 configured to monitor and/or control aspects of the power storage system 16. For example, the battery management system 60 may receive inputs from one or more sensors within or on the power storage system 16, which may include a plurality of exterior sensors 23 and interior sensors 30. The exterior sensor(s) 23 may include an exterior water sensor 24 configured to sense the presence of water on the exterior of the enclosure 64. In one embodiment, the exterior water sensor 24 may be a capacitive water sensor. Alternatively, the exterior water sensor 24 may be a resistive sensor or a thermal sensor configured to detect contact with water. Alternatively or additionally, the exterior sensor(s) 23 may include one or more of an exterior temperature sensor 25 configured to sense an external temperature on the enclosure or a temperature of the environment surrounding the enclosure, and an exterior pressure sensor 26 configured to sense an external pressure on or around the exterior of the enclosure. In some examples, the enclosure may be configured with multiple water sensors 24, temperature sensors 25, and/or pressure sensors 26, such as positioned on multiple sides of the enclosure to provide information regarding all sides of the enclosure 64.

The interior sensors 30 are positioned to sense the environment within the cavity 63 defined by the enclosure 64 and may include any one or more of an interior water sensor 31, an interior temperature sensor 32, an interior pressure sensor 33, an interior gas sensor 39, and an orientation sensor 41. Multiple temperature sensors 32 may be configured to sense temperature at location(s) within the enclosure of the battery pack 16', one or more pack internal pressure sensors 33 may be configured to sense pressure at location(s) within the enclosure, one or more water sensors 31 may be configured to sense water ingress into the cavity 63. Alternatively or additionally, the internal sensors may include a humidity sensor configured to sense humidity within the enclosure, such as to detect high humidity levels indicating the presence of water inside the pack. The interior sensors 30 may further include one or more electrolysis gas sensors 39 configured to sense the presence of gas (e.g., hydrogen gas) indicating that electrolysis is occurring. Alternatively or additionally, the interior sensors 30 may include one or more current and/or voltage sensors, and/or an IMM (Isolation Monitoring Module) configured to detect a loss of high voltage isolation from chassis. Alternatively or additionally, the interior sensors 30 (or the exterior sensors 23) may include one or more orientation sensors 41 configured to sense an orientation of the battery, such as to detect that the battery is inverted or otherwise not in an upright position (e.g., indicating that the boat is partially submerged or capsized). In other embodiments, the orientation sensor 41 may be provided on the exterior of the enclosure 64, and/or multiple orientation sensors may be provided to provide reliable orientation information.

Figure 3:
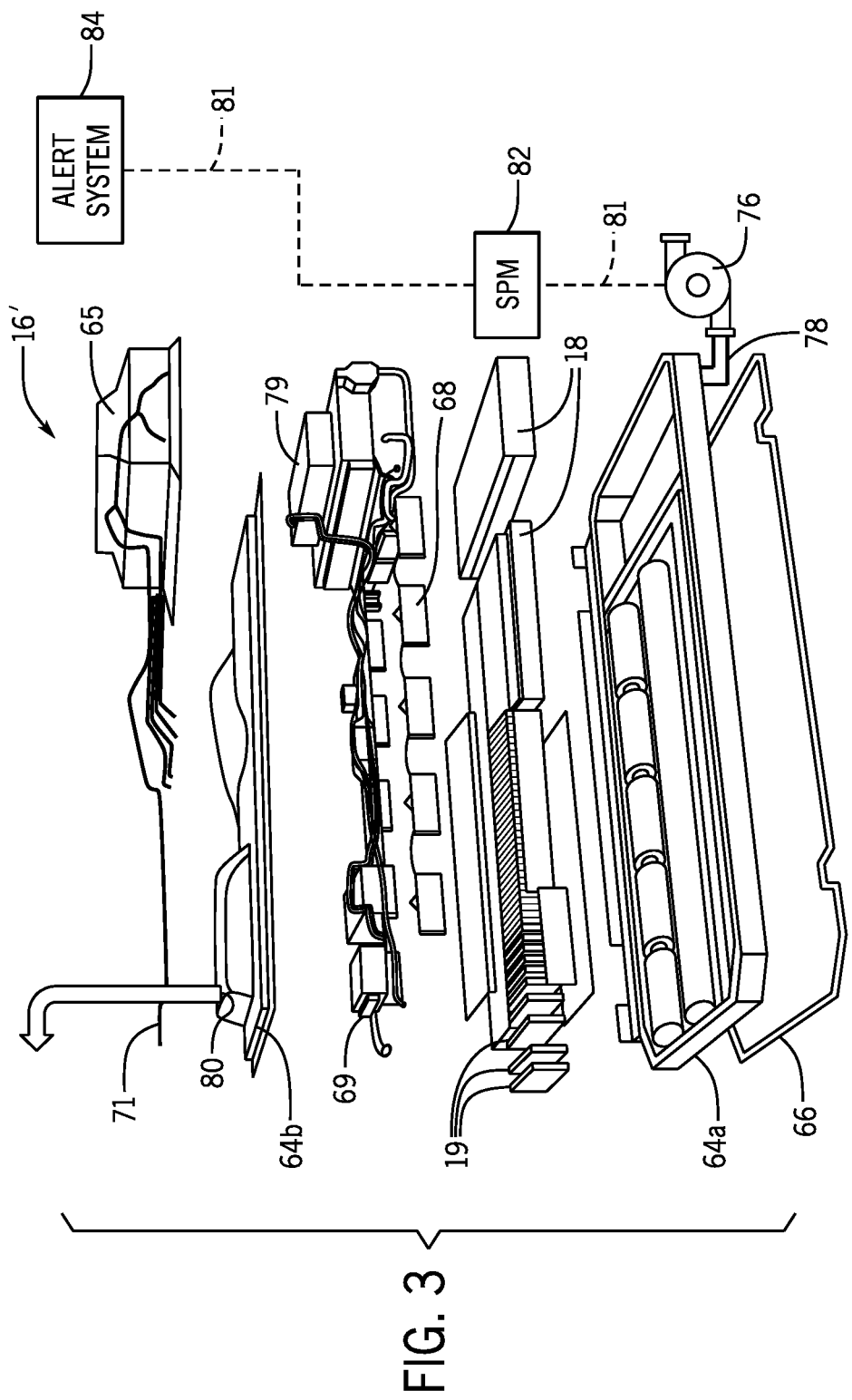
FIG. 3 is an exploded view of a marine battery pack according to another embodiment of the present disclosure.

Referring primarily to FIGS. 2 and 3 illustrating embodiments of a battery pack 16', multiple cell modules 18 may be contained within the cavity 63, such as 4-7 cell modules (e.g., 18a-18d). For example, each cell module 18a-18d may be a 50 V storage unit. The plurality of cell modules (e.g., 18a-18d) may be arranged in series to provide the high voltage output. Each cell module 18, or storage section, is comprised of multiple battery cells 19. Each cell module 18a-18d may have an associated cell monitoring unit 68a-68d configured to monitor parameters of the respective cell module. For example, the cell monitoring unit 68 may be configured to monitor voltage, current, temperature, and/or other parameters of each respective cell module 18. For example, one or more temperature sensors may be positioned on or within each cell module and the produced temperature measurements may be received at the respective cell monitoring unit 68a-68d.

Similarly, each cell monitoring unit 68 may be configured to receive input from local current sensors, voltage sensors, pressure sensors, and/or gas sensors configured to sense the local conditions in or around the cell module 18. The cell monitoring units 68a-68d may then report the measured temperatures and/or processed temperature data to the battery management system 60, which may be housed with the electronics 79 within the battery enclosure 64 or may be separately housed on or within the battery enclosure 64. Pressure sensor(s) 33 and/or gas sensor(s) 39 may also be located in or around the cell modules 18 and such data may also be received at the cell monitoring units 68, or may be transmitted directly to the battery management system 60.

The BMS 60 is configured to determine a battery state of health and to recognize a hazardous condition based on any one or more of the interior sensor 30 and exterior sensor 23 measurements. For example, the state of health may be determined based on measured temperature and/or rate of internal temperature rise, internal pressure measurements, battery orientation, G-levels endured, water exposure and/or the duration thereof, etc. The BMS 60 and/or a sensor processor module (SPM) 82 may be configured to recognize a hazardous condition of the marine battery based on the sensed values, such as by comparing each or a subset of the sensed values to threshold values or threshold change values. For instance, the SPM 82 may be configured to receive sensor data from the exterior sensors 23 and to detect conditions indicating immersion of the pack and to activate a shock hazard response or other protective response for the battery pack, and also may receive sensor data from the interior sensors 30 to detect thermal runaway and to activate a decommissioning response. The SPM 82 may further be configured to receive information, such as from the cell monitoring units 68, measured by current, voltage, and/or other sensors within the power storage system 16, such as to receive information about the voltage, current, and/or temperature of one more battery cells 19 and/or each cell module 18 within the power storage system 16.

Like the BMS 60, the SPM 82 may be located inside enclosure 64 or on or adjacent to an external surface of the pack. The SPM 82 may be powered by the pack, have its own power source, or be powered by an external power source. The SPM 82 may be incorporated into the BMS or may be a separate and independent control module.

One or more high voltage contactor(s) 69 may be provided that connect the cell modules 18, which are arranged in series, to an output connection attachable to a load on the marine vessel, such as the propulsion system 2. The high voltage contactor(s) 69, or connector(s), may be controllable, such as by the battery management system 60, to disconnect the power storing elements within the pack 16' from the external connection points on the enclosure 64. For example, one or more high voltage contactor(s) 69 may be placed between the series of cell modules 18a-18d and the output terminals 67a and 67b on the enclosure 64 configured to connect to the vessel load. When the contactor(s) 69 are opened, the storage elements within the battery are disconnected from the output terminals 67a and 67b and thus disconnected from the load and isolated from any contact surface of the enclosure 64.

If abnormal conditions are detected on or within the battery pack 16' warranting disconnection of the battery from the load, such as the detection of a water exposure event, then the high voltage contactor 69 may be opened to disconnect the high voltage elements inside the pack and prevent conduction to the outside of the pack. In certain embodiments, the pack may be configured such that the high voltage contactor 69 can be reset from outside of the pack. For example, a switch control user interface may be provided on the exterior of the enclosure and configured to allow the high voltage contact 69 to be closed and reset by a user. For example, a rotary switch interface 72 (see FIG. 4) or another type of switch interface may be electrically or mechanically connected to operate the high voltage contactor(s) 69 and manipulatable by the user (or a technician) to reset the contactor(s) 69 once tripped.

Alternatively or additionally, the system may include at least one service disconnect switch 62, which may be a set of switches 62a-62c, operable to break the battery down into smaller voltage units. For example, the system may include a plurality of service disconnect switches 62a-62c, each positioned between two of the cell modules 18a-18d and operable to electrically connect/disconnect the cell modules 18a-18d to/from one another in series. Thereby, the service disconnect switch(es) 62a-62c are operable to disrupt the series connection and reduce the maximum battery pack internal voltage to touch safe levels (e.g., less than or equal to 60 V DC).

The service disconnect switch(es) 62a-62c may be controlled by the BMS 60 (or SPM 82) to enable shock hazard prevention upon detection of a hazardous event, such as a water exposure event. In one example, each service disconnect switch(es) 62 may be a pyrotechnic device that opens the circuit connecting the modules 18 within the battery pack. In one example, the pyrotechnic activator is positioned on an exterior of the enclosure such that heat and gases vented from the pyrotechnic reaction are not vented into the pack. In other embodiments, the disconnect switch(es) 62a-62c may be linear switches, slide switches actuated by linear or rotary slides, solenoid driven contactors, relays, or the like. In further examples, each disconnect switch 62 may be a single pole single throw switch, such as configured as a limit switch, that connects or disconnect two cell modules. In other arrangements, the switch(es) 62 may be configured as a multi-position and/or multi-pole switch, such as a rotary switch, or some other type of switch. In some embodiments, the switch(es) 62 may be multi-position configured to place the cell modules 18 in series or parallel, such as to place all of the cell modules 18a-18d in parallel for safe discharge during decommissioning as described below.

In certain embodiments, the service disconnect switch 62 may be resettable by a user via a switch control user interface may on the exterior of the enclosure configured to allow the disconnect switch(es) 62a-62c to be closed and reset by a user. For example, the rotary switch interface 62' may be configured to control the disconnect switch(es) 62a-62c. In other embodiments, such as in the pyrotechnic embodiment, resetting the service disconnect switch 62 to reconnect the cell modules 18 requires a service technician to replace the service disconnect switch(es) 62 once the disconnection is triggered.

The battery pack 16' may include a coolant system having coolant lines 71 that run on and around the enclosure 64. Enclosure 64 may include a vent 74, such as a Gortex covered vent, configured to allow the assembly to breathe while preventing water ingress. Current battery certification standards, such as IP69k Certification Standards, require that the pack enclosure, all interconnects, and the venting system does not allow any liquid ingress for a certified time and depth. IP69K certification involves submersion of a battery pack assembly at peak operating temperature to a depth of 2 m for a defined period (typically 2 hours) and vigorous close range power washing of all interconnects with 15000 psi water or steam. However, when a battery pack of normal operating temperature is immersed in liquid (typically water), the pack assembly is cooled, creating a vacuum that will compromise the IP69K waterproof rating. The waterproofing will be compromised more quickly at greater depths, where appreciable pressure is incurred, and thus both pressure and time of exposure are factors that must be considered when monitoring an immersed battery.

In some embodiments, a condensate moisture gathering track may be provided in the bottom of the enclosure that channel moisture to a vent wicking system in normal battery orientation (essentially a vertical straw with a check valve) that forces the liquid out of the pack enclosure each time the assembly heats up to normal operating temperature and pressurizes relative to atmosphere. Additionally, an inert gas cartridge (CO2, N2 or other inert non-toxic, environmentally friendly gas) may be included and configured to pressurize a battery pack enclosure to match or exceed external pressure to prolong the time of exposure to a submersion condition to prevent or prolong the time to water ingress and the associated hazards.

FIG. 3 depicts an exemplary pouch-cell li-ion battery pack 16' comprising a plurality of modules 18, each containing a plurality of cells 19. The battery enclosure 64 may include a lower housing 64y that sealably connects to a housing cover 64x so as to prevent water ingress into the cavity 63. The enclosure may further include an upper housing 65 that sealably connects to the housing cover 64x, such as to cover the battery electronics 79. A lower trey 66 sealably connects to the lower housing 64y to form bottom side of the pack enclosure 64 and prevent water ingress on the bottom side. The enclosure 64 may be configured to provide a waterproof seal around the cavity 63 that protects against water ingress when the battery pack is exposed to certain pressures for specified timed durations.

In some embodiments, the BMS 60 and/or SPM 82 may be configured to communicate with the user interface system 35 and/or to control one or more alert devices on the enclosure 64 to provide warnings to a user regarding a water exposure event and/or the status of the automatic shock reduction response. For example, in a situation where the operator inadvertently launches the boat with the drain plug removed, the system may be configured to provide warning to a user of detected water. For example, the system may be configured to open the high voltage contactor(s) 69 and to generate a water exposure alert to advise the user of the water in the hull, such as before opening the disconnect switches 62a-62c or performing any automatic response requiring service by a technician to repair, to provide a stepped response to battery pack water immersion.

The SPM 82 and/or BMS 60 may be configured to communicate with or control an alert system 84, which may be integrated with the user interface system 35 of the vessel. The SPM 82 communicates with the alert system 84 via communication link 81, such as a CAN bus. For example, a water exposure alert may be provided on the display 40 of the user interface system 35 advising the user of the unsafe condition and providing an instruction to call for help and/or return home. Alternatively or additionally, an auditory alert may be provided. Alternatively or additionally, an alert may be provided on a remote user interface system, such as on a user's portable computing device that is communicatively connected with the user interface system 35 and/or the alert system 84. For example, the user interface system 35 may incorporate VesselView Mobile™ provided by Mercury Marine and configured to enable battery state of health and/or other battery-related alerts, including a water exposure alert.

Various sensing analysis methods to detect that the battery pack has been exposed to and/or immersed in water are disclosed herein and may be executed by the SPM 82 to detect a water exposure event. If a water exposure event is detected, then one or more electrical connections within the pack may be adjusted to reduce the shock hazard posed by the battery. In certain embodiments, the shock hazard reduction may be performed in stages based on the sensed conditions, so as to avoid unnecessarily disabling the battery system and/or inconveniencing the user more than necessary to sufficiently reduce the hazard.

Figure 5:
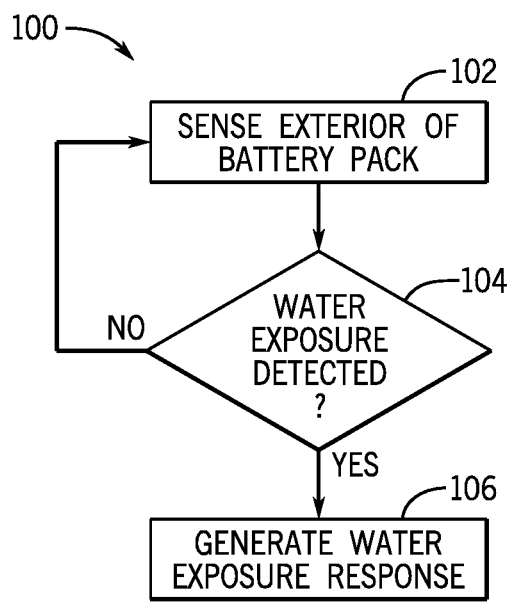
FIGS. 5-7 are flow charts illustrating methods of controlling a marine battery pack according to embodiments of the present disclosure.
Figure 6:
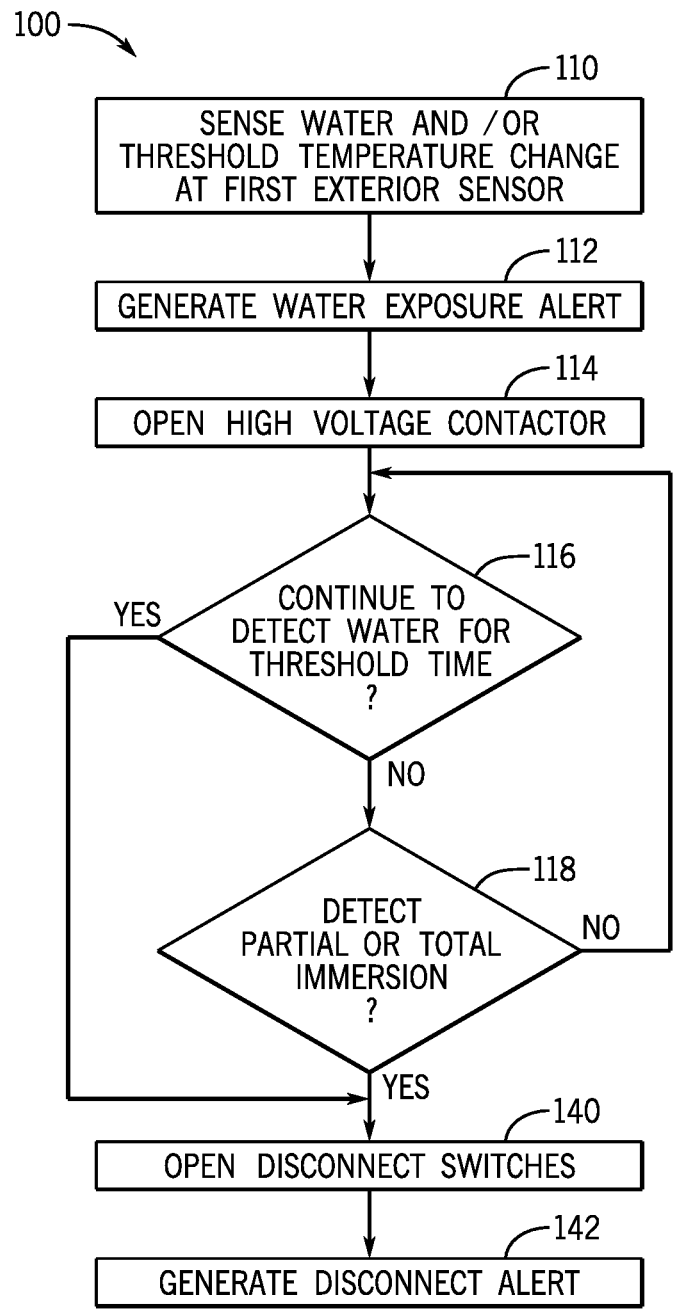
Figure 7:
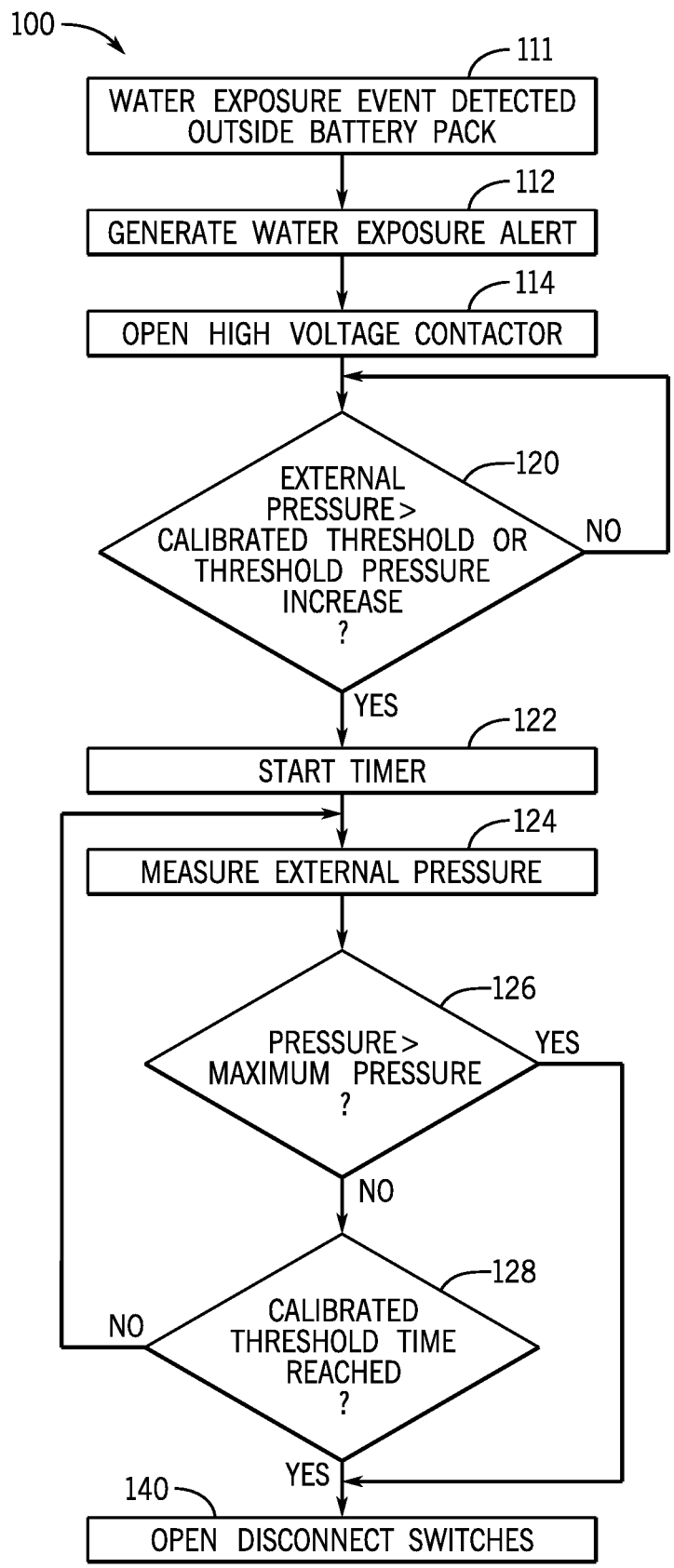

FIGS. 5-7 depict methods 100 of controlling a marine battery pack exemplifying embodiments of exterior water exposure event detection and response. In FIG. 5, a method 100 of controlling a marine battery pack 16' includes sensing an exterior of the battery pack 16' at step 102 via one or more exterior sensors 23. If water exposure is detected at step 104 based on the sensed values, such as based on a sensed exterior temperature, a sensed exterior pressure, and/or a detected presence of water on the exterior of the battery enclosure 64, then a water exposure response is generated at step 106. The water exposure response may include a water exposure alert, such as a visual alert and/or an auditory alert, generated to advise a user that the battery enclosure has been exposed to water. Alternatively or additionally, the water exposure response may include adjusting at least one electrical connection in the marine battery pack 16' to reduce a shock hazard.

Alternatively or additionally, the water exposure response may include releasing an inert gas inside the enclosure 64 to prevent or prolong the time to water ingress and the associated hazards. For example, an inert gas cartridge (CO2, N2 or other inert non-toxic, environmentally friendly gas) may be contained within the cavity 63 and configured/controllable to pressurize the cavity 63 to match or exceed external pressure to prolong the time of exposure to a submersion condition without water ingress.

FIG. 6 depicts one embodiment of a method 100 of controlling a marine battery pack, wherein the method includes a multi-stage water exposure response based on external conditions sensed over time. As described above, the enclosure may be configured with multiple exterior sensors, including multiple sensor types, positioned around the enclosure 64, such as on the top and bottom of the enclosure. In the example illustrated in FIG. 4, exterior sensor sets 23*a* and 23*b* are positioned at each of the top side 64*a* and bottom side 64*b* of the enclosure to sense external parameters at each location. Other placement locations are contemplated and within the scope of the disclosure, such as exterior sensors 23 positioned on the front side 64*c*, back side 64*d*, and/or lateral sides 64*e* and 64*f* of the battery enclosure 64. The purpose of multiple external sensor locations is to determine a location and extent of the water exposure, such as whether the battery pack 16' is partially or totally immersed in water.

Thus, exterior temperature, pressure, and/or presence of water detected at various locations around the pack, may be utilized to determine which portion of the pack is exposed to water and how long that portion has been exposed. For example, a pressure sensor 26 may be configured to detect abnormal external pressure and/or measure the depth of the battery pack 16' in water, and a time of submersion may be monitored based on the depth. Alternatively or additionally, immersion in water may be detected based on identification of a sharp transition in temperature, such as a threshold temperature change within a short period of time—e.g., over a few seconds—based on measurements from the exterior temperature sensor 25. Similarly, detection of the presence of water on the top or bottom of the battery pack 16' can indicate whether one or both of the top and bottom of the battery pack 16' are exposed to water, and thus whether the battery pack is partially or totally immersed.

In the exemplary method illustrated in FIG. 6, water exposure is detected at step 110 based on externally sensed water and/or detection of a threshold temperature change at a first exterior sensor set 23. For example, where water is collecting in the hull of the vessel, where exposure may be detected by an exterior sensor or sensor set 23*b* on a lower portion of the battery pack, such as a lower half 91*a* of the battery pack. Alternatively, depending on the position of the battery pack relative to the water ingress location, water may first be detected on an upper half 91*b* or on one lateral half 92*a*, 92*b*. A water exposure alert is generated at step 112.

As described above, the water exposure alert may include an on-board alert, such as via the user interface system 35 at the helm of the marine vessel. For example, the BMS 60 and/or the SPM 82 may be configured to generate a command to the user interface system 35 to generate a visual alert on the display 40 advising the user that the battery enclosure has been exposed to water. Alternatively or additionally, an alert may be generated to a user and/or owner/manager of the marine vessel, such as via a user's portable computing device configured to enable battery-related alerts.

A high voltage contactor is then opened at step 114 to disconnect the high voltage storage units inside the battery pack 16' from the output terminals. In certain embodiments, via any one or more of the foregoing alert mechanisms, may be generated to advise the user that the battery has been disabled via opening the high voltage contactor. Alternatively or additionally, one or more alert mechanisms on the battery enclosure 64 may be controlled to generate an alert regarding enabling the high voltage contactor, such as a warning light or an auditory alarm activated to advise someone near the battery and/or with a line of sight to the battery pack 16' that is no longer connected to the load.

In certain embodiments, the controller, such as the BMS 60 and/or the SPM 82 may be configured to continually monitor the external additions of the battery pack 16' and to take further steps to reduce the shock hazard should further water exposure events be detected. For example, the controller may be configured to continue assessing whether water is detected, and thus whether the threat of water ingress is continued. At step 116, steps are executed to determine whether water continues to be detected for a threshold period of time. If so, then one or more disconnect switches 62*a*-62*c* are opened at step 140 to break the battery down into smaller voltage units, such as by disconnecting the plurality of cell modules 18 from one another such that they are no longer electrically connected together in series. Thereby, the total voltage level within the pack 16' is significantly reduced. The threshold period of time may be based, for example, on the waterproof rating of the pack, such as less than or equal to a rated time underwater. FIG. 7 illustrates one such example.

The controller may further be configured to detect partial or total immersion of the battery pack 16', represented at step 118. For example, sensor data from multiple sensors positioned on different exterior surfaces of enclosure 64 may be assessed to determine where water is (and is not) present. For example, if water is only detected on a lower half 91a of the enclosure 64 for a period of time, then partial immersion may be determined. If water is detected on a lower half 91a and is also detected on an upper half 91b of the enclosure 64, such as detected by the external sensor set 23a positioned on a top side of the enclosure 64, then total immersion may be identified. In various embodiments, the system may be configured to open the disconnect switches upon detection of partial immersion, or may require total immersion, or partial/total immersion for a period of time, before opening the disconnect switches at step 140.

Once the disconnect switches are opened, a disconnect alert may be generated at step 142, such as via the alert mechanisms described above. The disconnect alert is configured to advise the user that the battery has been broken down into smaller voltage units, and thus the full battery voltage is no longer available. In certain embodiments, the opened disconnect switches 62a-62c may be resettable by a user. In other embodiments, such as where the disconnect switch(es) are pyrotechnic devices, opening the disconnect switches may require service by a trained technician to reconnect or replace the switch(es) 62a-62c and reestablish the battery voltage. Accordingly, the disconnect alert may be configured to advise the user on steps necessitated based on the shock hazard reduction action that has been performed, including in view of opening the disconnect switches and/or opening the high voltage contactors.

FIG. 7 depicts another embodiment of method 100 for controlling a marine battery pack 16' according to the present disclosure. A water exposure event is detected outside the battery pack using one or more exterior sensors at step 111. A water exposure alert is then generated at step 112 and one or more high voltage contactors are opened at step 114, such as described with respect to FIG. 6. Steps are then executed to determine whether the marine battery is at least partially immersed based on one or more exterior pressure measurements. If the external pressure measured by the exterior pressure sensor exceeds a calibrated threshold or a threshold pressure increase in a predefined time period at step 120, then the controller determines that at least partial immersion is detected and a timer is started at step 122.

The exterior pressure is continually determined at step 124 based on pressure data from one or more exterior pressure sensors 26 on the enclosure 64. The pressure measurements are compared to a maximum pressure at step 126, which may be a maximum rated pressure that the enclosure 64 is configured to withstand for any period of time. If the maximum pressure is exceeded at step 126, which would indicate that the battery pack 16' is relatively deep underwater, then the disconnect switches are opened at step 140. Based on the measured external pressure, a calibrated time period is identified and monitored to determine whether battery pack 16' has been exposed to a given pressure for the maximum rated time period at that pressure. As the external pressure increases, the time threshold decreases. If the calibrated threshold time based on the measured external pressure is reached at step 128, then the disconnect switches are opened at step 140.

In other embodiments, different steps may be executed to detect and monitor partial or total immersion, which may be in addition to the foregoing pressure-based analysis or in lieu of the pressure-based analysis. For example, water detection, temperature measurements, orientation monitoring, G-force measurements, and/or other parameters may be utilized as described herein to detect the presence of water and/or to identify partial or total immersion.

After the service disconnect switch(es) 62 is/are opened, the battery pack will have several low voltage modules that still contain substantial amounts of stored electrical energy. Other steps may be taken to mitigate shock and/or thermal conditions, such as de-energizing the battery cells via balancing resistors in the battery management system (BMS) and/or draining current from the battery cells by other means. Stored electrical energy in the batteries may be dissipated more quickly with high capacity liquid-cooled ballast resistors or with touch-safe voltage electrical loads powered by the cell modules 18 (e.g., in parallel). For example, one or more cooling mechanisms may be powered by the cell modules 18 to both drain the stored energy and cool the cavity 63. In one embodiment, the cooling activity of the battery cooling system may also be increased by maximizing the water pumping around the battery enclosure to maximize cooling the battery back as much as possible without completely decommissioning and destroying the power storage system.

However, regardless of the mitigation efforts, the hazard may increase further. A battery pack ingress protection rating indicates the prevention of water ingress for a specified depth and time. As described above, enclosure 64 is configured to provide a waterproof seal around cavity 63 that protects against water ingress when the battery pack is exposed to certain pressures for specified time durations. However, after that period of exposure underwater, or due to a malfunction of the enclosure, water ingress is possible and even likely. Water ingress will cause shorting of the cells, leading to thermal runaway and unsafe battery conditions. Extended submersion of a battery pack in water will eventually lead to water ingress, cell shorting, uncontrolled discharge, and a battery pack thermal event. While the battery pack 16' does include a cooling system having coolant lines 71 that run on and around the enclosure 64, the cooling system is insufficient for cooling the battery in the event of significant water ingress and/or a thermal runaway event.

Where a hazardous battery event is imminent or is occurring, the marine battery pack may be configured to automatically decommission itself to maximize safety. The control system may be configured to detect such events warranting decommission—such as thermal runaway or a sufficient amount of water ingress that thermal runaway is highly likely—and automatically execute a controlled decommission of the power storage system, such by flooding it with water, injecting foam, and/or injecting inert gas into the enclosure of the battery pack. While such decommissioning steps likely permanently destroy the power storage capabilities of the pack and the elements therein, the decommissioning steps are performed to reduce the hazard posed to passengers aboard a marine vessel and/or to the surrounding environment of the power storage system.

The inventors have recognized that the system can utilize the operational environment of a marine application as a source for battery cooling to remove heat and gas buildup during a thermal event. Thus, in one embodiment, the system uses the body of water the vessel is floating on to provide cooling water that can be pumped up through the pack, inside the enclosure to cool the cells and flush out cell vented gases. Such a water-flooding system may be utilized for decommissioning marine batteries on marine vessels experiencing a catastrophic event where the battery poses a safety risk, and also may be used on any li-ion storage system with direct access to a body of water, such as power storage and/or charging systems on a dock or in a marina.

Figure 4:
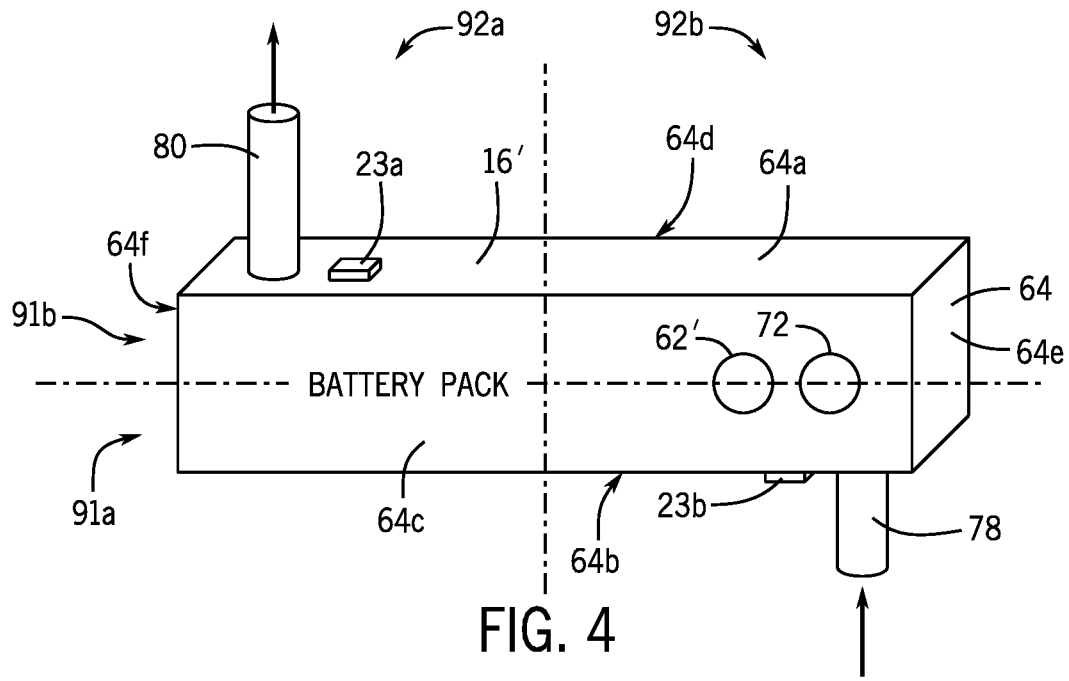
FIG. 4 is an exterior view of a marine battery pack according to another embodiment of the present disclosure.
Figure 8:
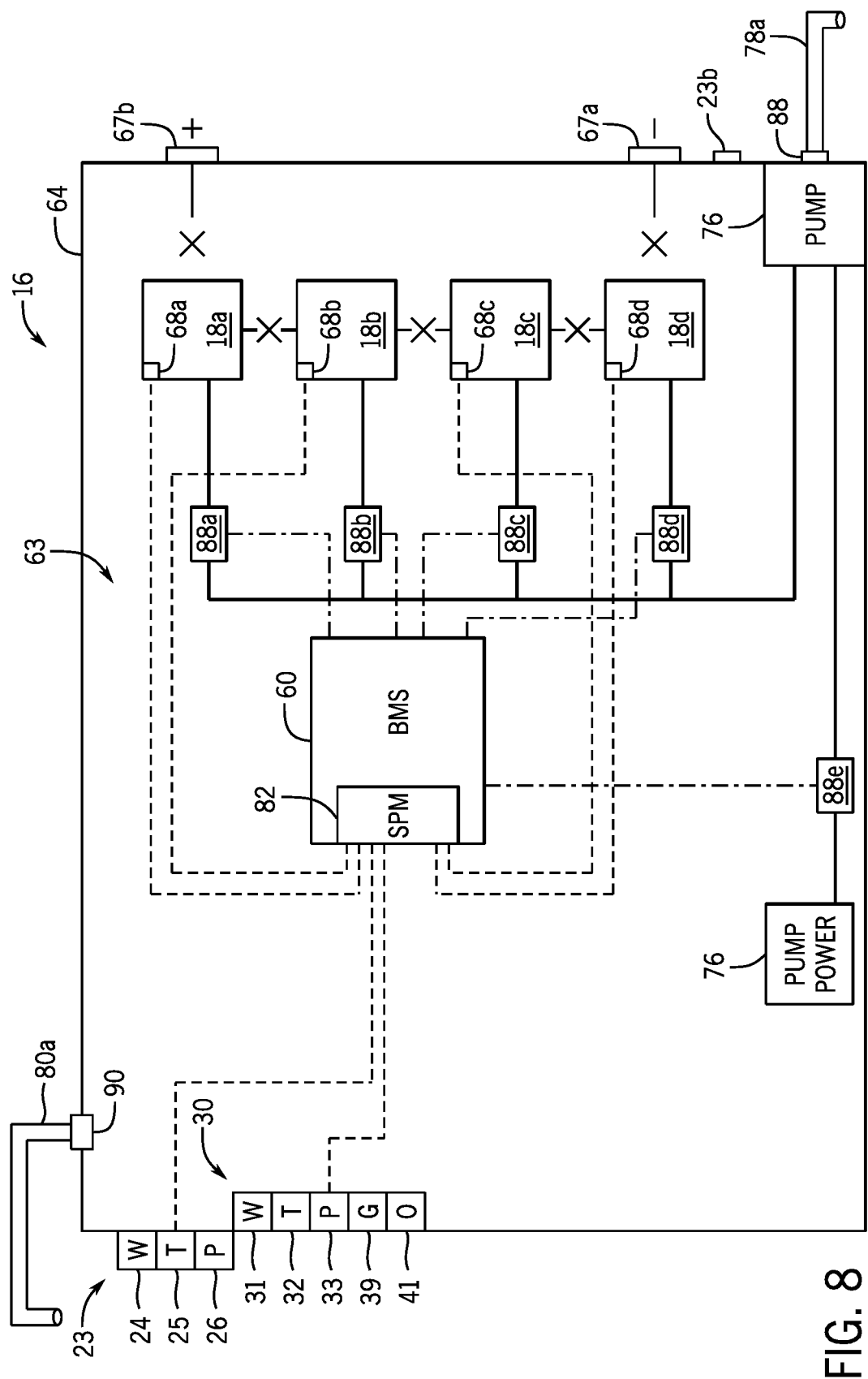
FIG. 8 is a diagram of a marine battery pack according to another embodiment of the present disclosure.

For example, while generally configured to prevent the ingress of water, the battery pack 16' may be configured such that a plurality of ports are opened upon detection of an event warranting decommission. As illustrated in FIGS. 3, 4, and 8, the battery pack 16' may be configured such that at least two ports are opened, such as an inlet port 88 on a lower half 91*a* of the enclosure and an outlet port 90 on an upper half 91*b* of the enclosure 64. In one embodiment, the outlet port 90 is formed by opening the vent 74, such as by expelling or otherwise removing the gortex plug. For example, one or more port opening elements may be included that open ports 88, 90 to facilitate decommissioning. Exemplary port opening elements are discussed below concerning FIG. 9. In some embodiments, a pump 76 may be utilized to pump water into and through the interior cavity 63 once the ports are opened to effectively cool any li-ion battery pack that has access to a water source. This reduces the time required to get cooling to cells that have reached thermal event temperature and would flush out electrolysis gas.

Referring again to FIGS. 3-4 and also to FIG. 8, an electric pump 76 may be configured and controllable to pump water through a water inlet 78 in enclosure 64. Pump 76 is configured to intake water from outside the enclosure, such as through inlet port 88, and pump water through the cavity 63 including over cell modules 18 and cells 19 to cool them. The water may be forced up through the enclosure and exit through outlet port 90, along with any electrolysis gas produced by the cells 19. A continual flow of water is thereby provided to cool the battery cells 19 until the energy stored therein is sufficiently dissipated that heat and gas generation is no longer a problem.

In various embodiments, pump 76 may be located inside enclosure 64, such as configured to draw water into water inlet pipe 78*a* and through inlet port 88 in enclosure 64 from inside, or may be connected to the outside of enclosure 64 or other housing on the battery pack 16' and configured to force the water through the inlet port 88 into the pack from outside. In various examples, the pump 76 may be a positive displacement or centrifugal pump located to intake the body of water and push it through the cavity 63.

In certain embodiments, the system may be configured to detect immersion in water before opening ports 88, 90 and/or before pumping water. In certain embodiments, the system may be configured to enable water to be drawn from below a marine vessel and/or below a dock where the battery pack 16' is installed to utilize the surrounding body of water to decommission the battery pack 16' when necessary and when the pack is not immersed in water. For example, an inlet pipe 78*a* or passage may be configured to allow water to be drawn in from outside the vessel, such as from a location on the hull of the vessel below the waterline or from a location on a submerged portion of an outboard propulsion device to inlet port 88 on the enclosure or to an intake of the pump 76. Pump 76 is connected and configured to pull water from the exterior, such as the exterior of the vessel, through the inlet pipe 78*a* and force the water through the inlet port 88 and to the outlet port 90. An outlet pipe 80*a* may be configured to receive the heated water and electrolysis gasses outputted from enclosure 64 and to guide the emissions to an output location, such as outside the hull of the vessel. The output location of the outlet pipe 80*a* may be positioned to guide the emitted water and gasses away from passengers on the vessel, such as to an output port on the lower portion of the hull below the waterline.

Activation of the pump 76 (and/or the access port) may be controlled by the BMS 60 and/or SPM 82 configured to receive data gathered by sensors and sensing systems on and in the battery pack 16', particularly the internal sensors 30, and to determine when decommissioning is warranted—i.e., the controller(s) may be configured with a set of instructions executable to determine when an event warranting decommissioning is detected. The electrically-driven water pump 76 is powered by a battery power source, which could be an external power supply associated with and/or housed with the pump (inside or outside the enclosure 64) or could be from the battery pack itself. In one embodiment, the remaining stored energy in the battery pack can be used as a source of power for pumping water through the enclosure. For example, pump 76 may be configured to draw power from one or more of the cell modules 18, which has the added benefit of dissipating energy from the battery cells 19 and expediting the process of getting the battery pack 16' to a safe and stable state.

The modules can be used in parallel to power an electric water pump configured to pump water through the pack to cool the cells and flush gasses out. For example, the system may be configured to operate pump 76 until the power source, be it the cell modules 18 or an external power supply, is depleted. The pumping rate will naturally taper off as the stored battery energy is fully dissipated decommissioning the battery pack and mitigating the hazards. Thereby, the hazard is reduced in two ways: 1) by using the surrounding water to reduce the temperature and gas buildup, and 2) by draining the stored energy in the batteries to drive the pump until a low state of charge (SoC) is reached.

For example, the battery pack 16' may include one or more power switches 88*a*-88*e* configured to connect the pump 76 to a power source, including connecting the pump 76 to the plurality of cell modules 18*a*-18*d* in parallel so that each cell module 18*a*-18*d* can be used to power the pump. In the example of FIG. 8, one switch 88*a*-88*d* is positioned and configured to connect a respective cell module 18*a*-18*d* to the pump 76 to enable current to flow from each of the cell modules 18*a*-18*d* to the pump 76. Diodes and/or other circuit elements may be provided to prevent current flow between cell modules 18*a*-18*d* and thus to only permit current to flow out of the cell modules 18*a*-18*d*. In other embodiments, differing switch configurations may be provided to selectively connect one, a plurality, or all of the battery cells 19 to the pump 76 to deliver power thereto and drain the energy from the cells to decommission the battery pack as quickly and safely as possible.

The switches may be controllable by the BMS 60 and/or SPM 82, which are configured to determine when an event warranting decommission is detected and which cell modules 18*a*-18*d*, if any, should be connected to power the pump 76, and to operate the switching network 88*a*-88*d* accordingly. For example, the BMS 60 and/or SPM 82 are configured to receive data gathered by sensors and sensing systems on and in the battery pack 16' and to detect where—i.e., at which cell modules—thermal runaway is occurring and to disconnect (or avoid connecting) any such cell to the pump 76. As described above, such localized detection of thermal runaway may be performed based on temperature information received from the cell monitoring units 68*a*-68*d* and/or received directly from one or more interior temperature sensors 32.

Alternatively or additionally, the battery pack 16' may include a dedicated pump power source 95 configured to power the pump 76. The dedicated pump power source 95 may be, for example, a low voltage battery connectable to the pump 76 and configured to power the pump at a touch-safe voltage. The dedicated pump power source may be isolated from, and thus not connectable to, the terminals 67a-67b and from the plurality of cell modules 18a-18c such that it is not used in conjunction therewith to power the vessel load. A power switch 88e may connect the pump power source 95 to the pump 76, which may be controllable by the BMS 60 and/or SPM 82 upon detection of the event warranting decommission, as described above. The dedicated pump power source 95 may be housed inside the enclosure or may be located and housed outside of enclosure 64. In either arrangement, the dedicated pump power source 95 may be housed to thermally and electrically isolate and protect it from the cell modules 18a-18c so that it can continue to operate even when thermal runaway is occurring in one or all of the cell modules.

In another embodiment, the battery pack 16' may be provided with an electronically controlled access port that is controllable to allow water to enter or exit the pack either naturally or by a controlled means when decommissioning is warranted. The access port(s), e.g., inlet and outlet ports 88 and 90, may be opened before operating pump 76 to enable water flow through the cavity. Alternatively, in embodiments without a pump, the battery pack 16' may be configured to open ports when decommissioning is warranted and the battery enclosure 64 is immersed in water to allow water to naturally flow through the cavity 63 during a thermal runaway event, which may shorten or lessen the impact of the event.

Figure 9:
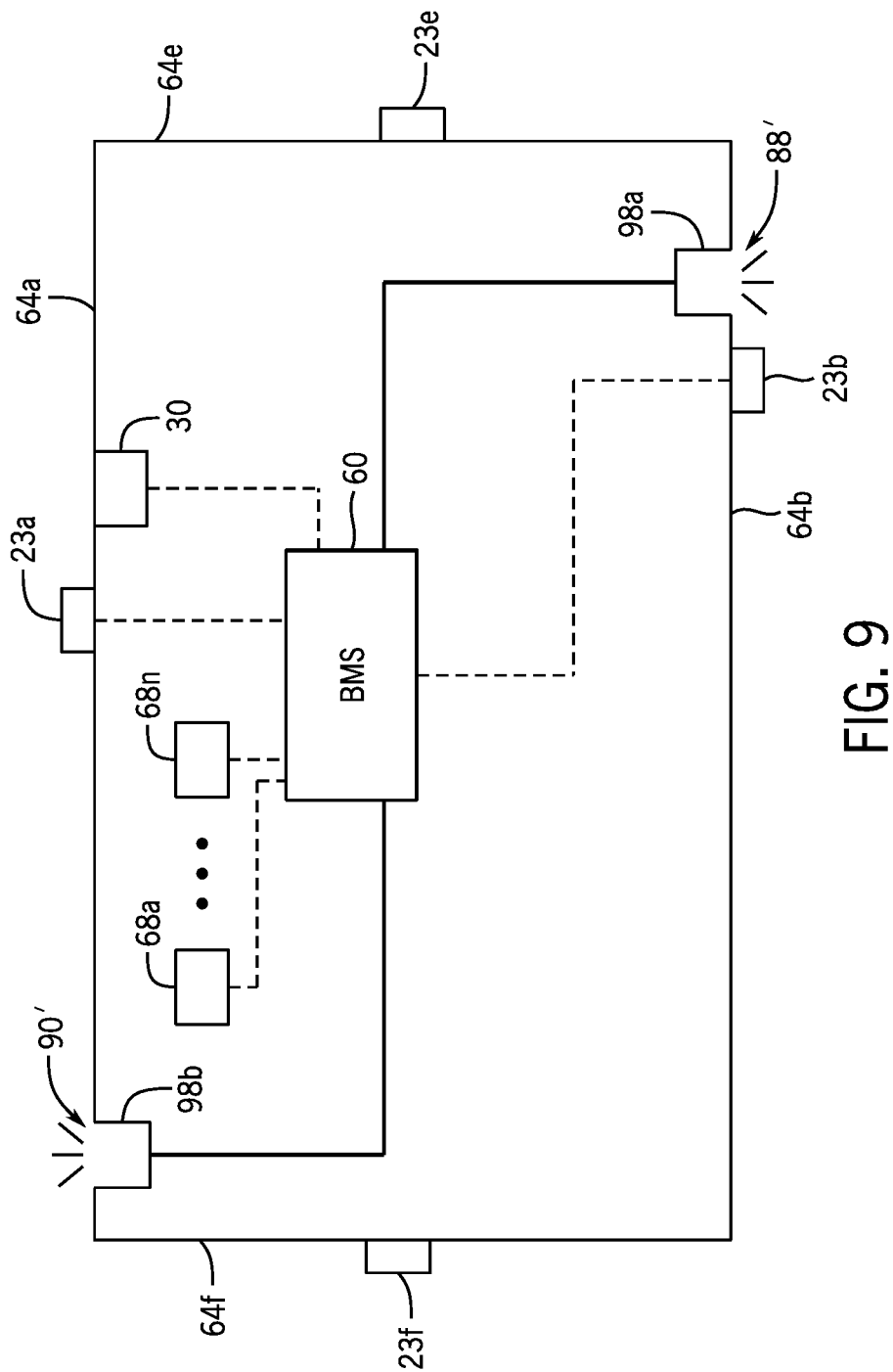
FIG. 9 is a diagram of a marine battery pack according to another embodiment of the present disclosure.

The battery pack 16' may be configured with one or a plurality of port opening elements 98a, 98b, each configured to open a port, or hole, in the enclosure to allow water to flow into and out of the enclosure 64. FIG. 9 depicts one such example, where a first port opening element 98a is configured to open a first port 88' and a second port opening element is configured to open a second port 90'. The ports 88' and 90' may be configured to permit the bidirectional flow of water into and out of cavity 63, such as holes in the top, bottom, and/or sides of the enclosure 64. Thus, the water is permitted to flow through cavity 63 as the thermal event occurs in either direction depending on the dynamics of the event and/or the orientation of the battery pack 16'. Alternatively, the ports 88' and 90' may be configured to permit only unidirectional flow, such as in conjunction with the flow direction generated by the pump 76.

For example, one or both of the port opening elements 98a, 98b may be an electromechanical element, such as a valve or other device operable to open a port hole 88', 90'. For example, the port opening element 98a to open the first port 88, 88' may be a valve at the outlet of the pump 76 with a pressure setting that is within the standard operating limits of that pump. The same valve could be applied to the outlet side of the pack (e.g., outlet port hole 90, 90'), or the gortex-covered vent 74 may be configured to open upon reaching an expected pump pressure. In still other embodiments, port opening elements 98a and 98b may be a multi-operating valve to open both sides by a single mechanism or actuator once the pump begins pumping.

Alternatively, the port opening elements 98a, 98b may be electromechanical or pyrotechnic devices configured to force an opening in the enclosure to create the port hole 88', 90'. In certain embodiments, enclosure 64 may be configured with a weakened spot, such as scored or perforated, and the port opening elements 98a, 98b may be configured to apply pressure at that weakened spot such that the port opening elements 98a, 98b operate to open a hole in the enclosure 64 at a predictable location and that is a predicable size and shape. In another example, the electromechanical device configured to force an opening the enclosure may include a solenoid configured to move a piercing device, such as a spear, on the movable plunger to puncture a hole in the enclosure 64.

The port opening elements 98a, 98b may be controlled by the BMS 60 and or SPM 82 upon detection of an event warranting decommission, such as detection of thermal runaway based on values from internal sensors 30 including sensors in or associated with the cell modules 68a-68n. The port opening elements 98a, 98b may be powered by one or more of the cell modules 68a-68n, such as by one or more switches as described above.

The port opening elements 98a, 98b may be located on multiple sides of enclosure 64 to open a plurality of ports. In an embodiment where a pump 76 is included, the port opening elements 98a and 98b may be strategically located to open the first port 88, 88' and/or the second port 90, 90' connected to the pump inlet and outlet pipes 78a and 80a. In other embodiments without a pump, the port opening elements 98a and 98b may be placed on various sides 64a-64f of the enclosure 64 to open a plurality of ports, or holes, in the enclosure to allow water ingress/egress and to allow electrolysis gasses to escape.

For example, a first port 88' may be opened on a bottom half 91a of the enclosure and a second port 90' may be opened on a top half 91b of the enclosure, such as on the top side 64a and the bottom side 64b. Alternatively or additionally, ports may be opened on each lateral half 92a and 92b of the enclosure 64 to encourage flow over all of the battery cells 19. For example, ports may be opened on each of a first lateral half 92a of the top side 64a and a second lateral half 92b of a bottom side 64b to cause water to flow diagonally through the cavity, encouraging flow through substantially all of the cavity 43 to reach all of the cells 19. Similarly, ports 88', 90' may be on opposing sides of enclosure 64 to encourage flow from end to end through cavity 63, such as on the top side 64a and the bottom side 64b, on the front side 64c and the back side 64d, or on opposing lateral sides 64e and 64f. In some embodiments, ports may be opened on three or more sides to encourage gas escape and water flow. In some embodiments, multiple ports may be opened on one or more sides, on two or more sides, on three or more sides, on four or more sides, on five or more sides, or on all sides of the enclosure 64. For example, multiple ports may be opened on each of the bottom side 64b and the top side 64a.

In certain embodiments, the battery pack 16' may be configured to detect immersion of the enclosure 64 in water before operating the port opening elements 98a, 98b, which may include detection of partial immersion or total immersion. Exemplary methods for detecting immersion by the controller(s) based on values measured from external sensors 23, the BMS 60 and/or SPM 82, are discussed above. In the example at FIG. 9, the BMS 60 receives input from multiple external sensors 23a-23f on each of the sides 64a-64f to detect which sides are exposed to water. For partial immersion detection, the BMS 60 may be configured to detect water on at least one side or on at least two sides on a lower half 91a. For total immersion detection, the BMS 60 may be configured to detect water on all sides 64a-64f, or on the top and bottom halves 91a and 91b. In certain embodiments, one or more exterior sensors 23 may be located at or near the port location(s) to determine that water will be enabled to flow through cavity 63 once the ports are opened.

Figure 10:
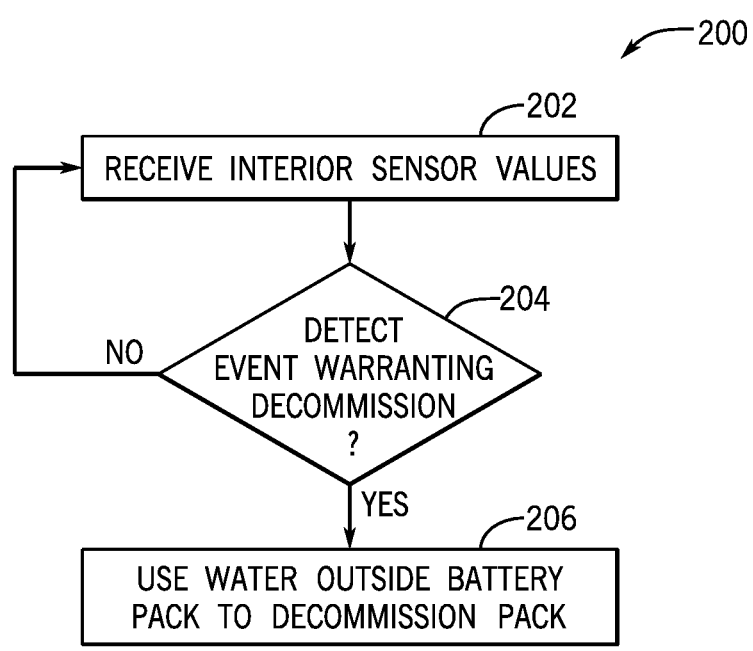
FIGS. 10-13 are flow charts illustrating methods of controlling a marine battery pack to decommission the battery pack according to embodiments of the present disclosure.

FIGS. 10-13 depict embodiments of methods 200, 300 of controlling a marine battery pack according to embodiments of the present disclosure. In FIG. 10, the method 200 includes receiving interior sensor values at step 202 and then detecting an event warranting a decommission at step 204 based on the interior sensor values. Once an event warranting decommission is detected, such as thermal runaway, systems are engaged to decommission the battery pack 16' using water from outside the pack to flow through the cavity 63 and over the battery cells 19 to cool them.

Figure 11:
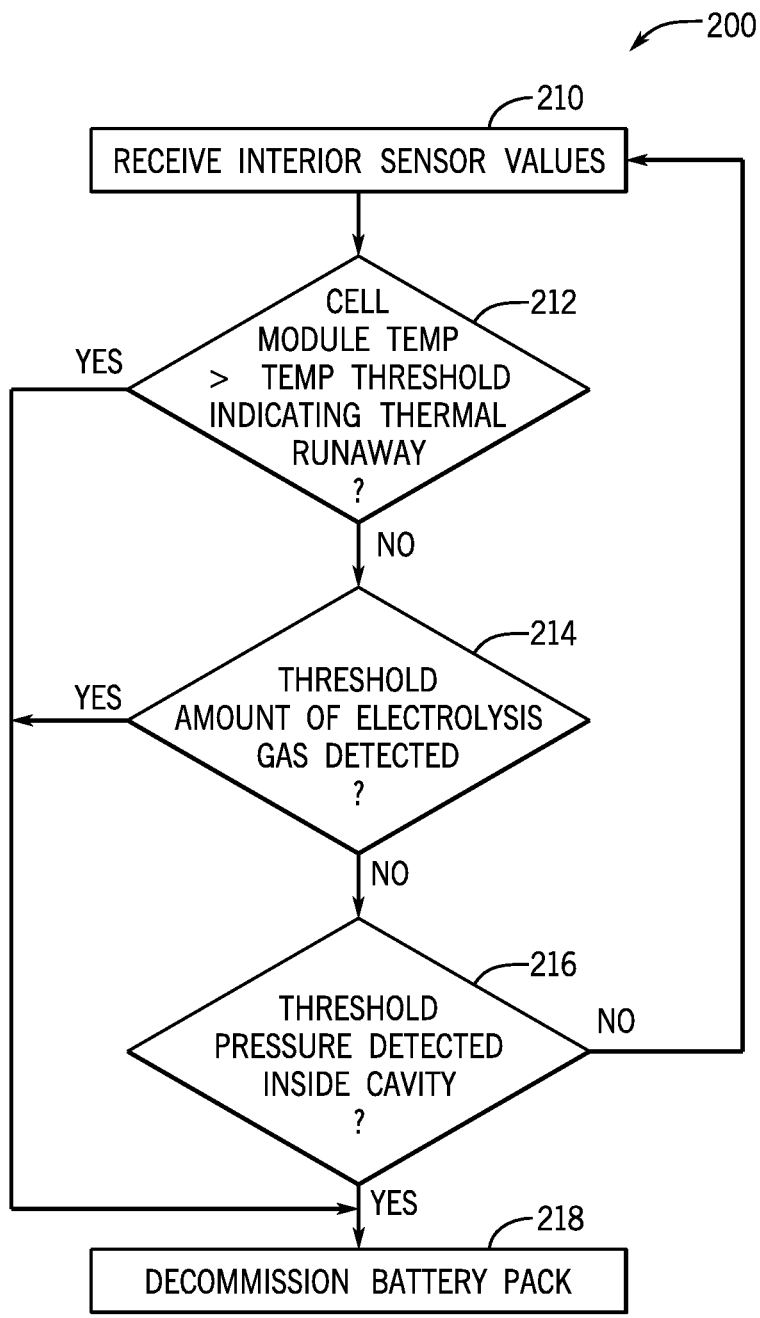

FIG. 11 depicts another embodiment of method 200 of controlling a marine battery pack according to the present disclosure. Interior sensor data is received at step 210. Steps 212-216 are executed to determine whether the interior sensor data indicates the occurrence of an event warranting decommission. Instructions are executed at step 212 to compare internal temperatures, such as the cell module temperatures, to a temperature threshold indicating thermal runaway. If the temperature threshold is exceeded, then an event warranting decommission is detected and steps are executed to decommission the battery pack. At step 214, values from one or more interior gas sensors 39 are compared to a threshold to determine whether an amount of electrolysis gas is detected in the cavity indicating thermal runaway. If so, then actions are performed to decommission the battery pack, represented by step 218. Instructions are executed at step 218 to compare values from one or more interior pressure sensors 33 to a threshold pressure indicating thermal runaway or other catastrophic event warranting decommission. If so, then the controller moves to step 218 to instruct and control decommissioning with the battery pack 16'.

Figure 12:
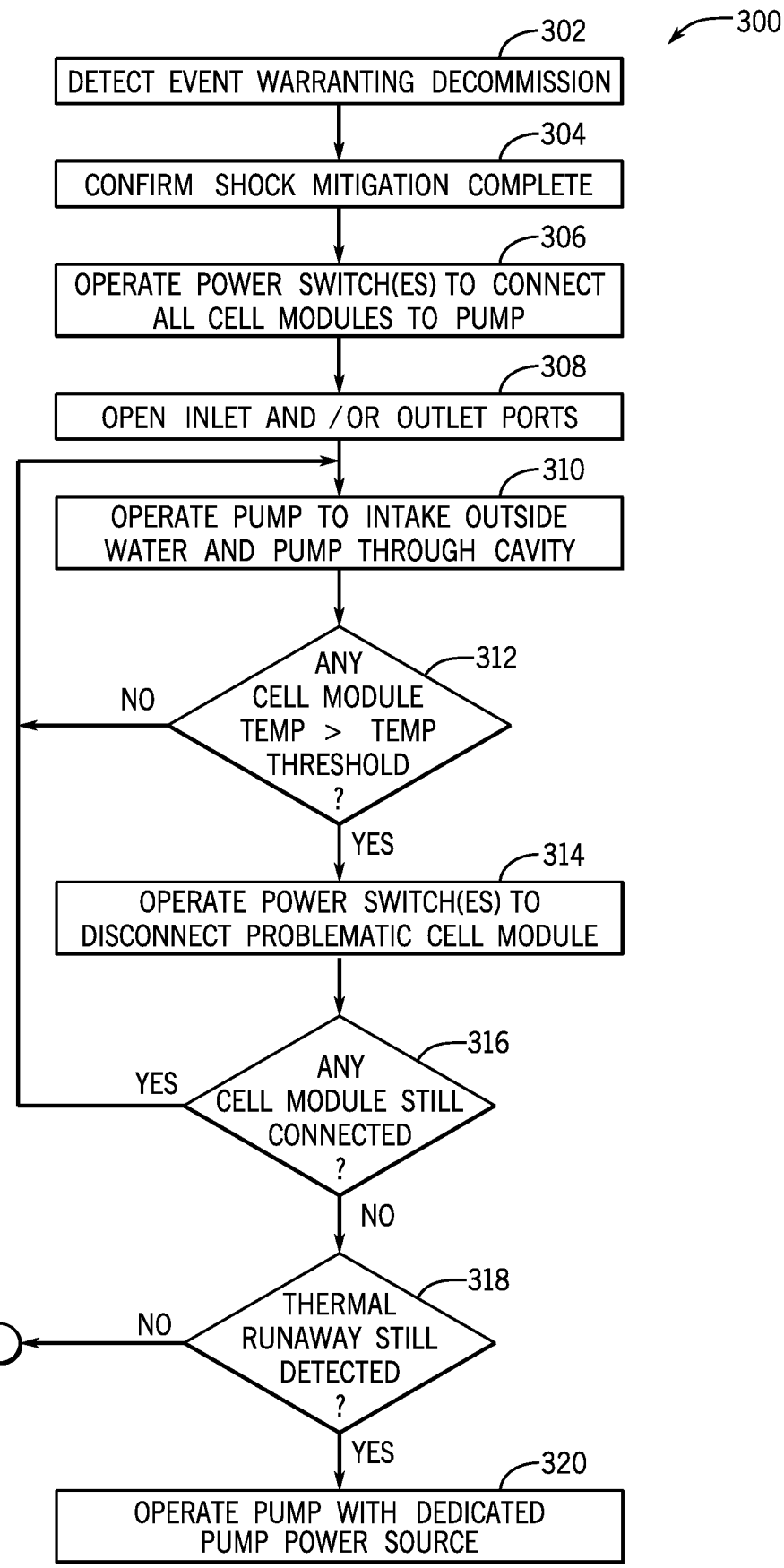

FIG. 12 depicts an embodiment of method 300 of controlling a marine battery pack 16' to decommission using a pump to intake water from outside the enclosure 64 and pump water through the cavity 63. Once an event warranting decommission is detected at step 302, instructions are executed to confirm that shock mitigation is complete. For example, the BMS 60 may be configured to confirm that the disconnect switches 62a-62c have been opened otherwise that the cell modules 18a-18d are no longer connected in series, as represented in FIG. 8, and thus that the battery pack has been broken down into smaller voltage units. Alternatively or additionally, the BMS 60 may be configured to confirm that the cell modules 18a-18d have been electrically disconnected from the output terminals 67a and 67b.

Once shock mitigation is confirmed, one or more power switches 80a-80d are operated to connect all, or at least a portion, of the cell modules 18a-18d to pump 76 to provide power thereto. Inlet and/or outlet ports are opened at step 308 to allow water to flow through cavity 63 from the inlet port 88 to outlet port 90 in enclosure 64 to cool the plurality of battery cells 19. The pump is then operated to intake outside water and continues to pump water through the cavity, represented at step 310, until power is drained from all the cell modules and/or any dedicated pump power source, and/or until the thermal runaway is no longer detected. In the exemplary embodiment, instructions are executed at step 312 to determine whether any cell module temperature exceeds a temperature threshold, such as a temperature threshold indicating advanced thermal runaway where energy can no longer be safely and predictably withdrawn from the cell module. For example, if the temperature continues to rise after water pumping has started or if loading the cell module causes a rise in temperature such that the threshold is exceeded, then that cell module may be disconnected from the pump 76 at step 314. For any cell module where the temperature threshold is exceeded or a threshold change in temperature occurs, one or more power switches 88a-88d are operated to disconnect the problematic cell module 18a-18d from powering the pump 76. If any cell modules are still connected, as confirmed at step 316, then the BMS 60 continues to operate the pump to intake outside water and pump through cavity 63 to drain power from and continue cooling the cell modules 18a-18d to the extent possible.

In certain embodiments, the battery pack 16' may contain a dedicated pump power source 95 as a backup pump power source if all of the cell modules 18a-18d are inoperable due to advanced thermal runaway. If no cell modules are still connected and powering the pump at step 316, then the BMS may assess some or all of the module temperature(s) at step 318 to determine whether thermal runaway is still detected. If not, then the battery is deemed fully decommissioned and the pumping process ended. If runaway is still detected at step 318 then the dedicated pump power source 95 is operated, such as by closing the switch 80e, to power the pump 76 at step 320. For example, the dedicated pump power source 95 may be operated to continue pumping water through cavity 63 until the power is fully drained from the pump power source 95. Alternatively, the pump may be operated until thermal runaway is no longer detected.

Figure 13:
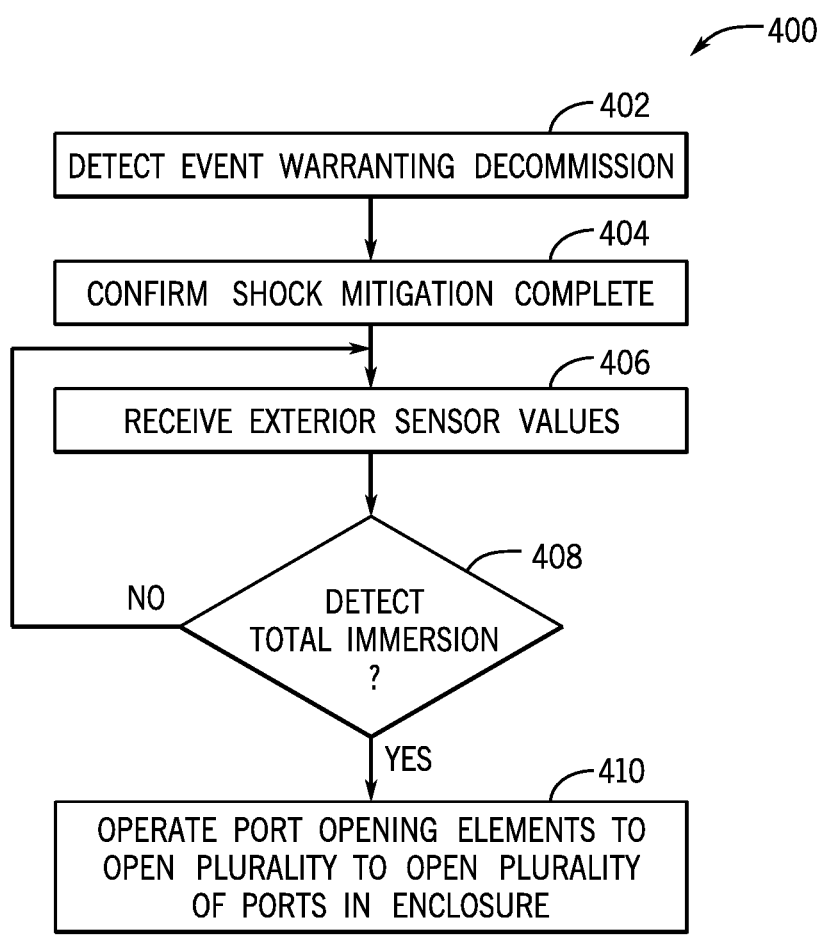

FIG. 13 depicts method 400 of controlling a marine battery pack to perform battery decommissioning actions. Once an event warranting decommission is detected at step 402, steps are executed to confirm the completion of shock mitigation at step 404, as described above. The BMS may then monitor exterior sensor values at step 406, such as from one or more exterior sensors 23 positioned around the exterior of the enclosure 64 to sense water, temperature, pressure, and/or orientation. Steps may be executed to detect total immersion at step 408 such as to detect the presence of water or temperature or pressure values indicating immersion on all sides 64a-64f of the enclosure 64. Once total immersion is detected, one or more port opening elements 98, 98b are operated at step 410 to open a plurality of ports in the enclosure 64 to permit water flow through the cavity 63 between at least a first port 88' and a second port 90' when the enclosure 64 is totally immersed in water.

In certain embodiments, the response to a detected battery event warranting decommissioning may further include releasing or injecting a foam material, such as liquid foam, into the battery pack to coat and insulate the exposed conductive surfaces inside the battery pack enclosure to prevent shorting of the cells if water enters the battery pack or if another type of event occurs that could lead to corrosion and/or shorting. Such foam release may be performed before pumping water or may be performed as a decommissioning response instead of pumping water. In certain examples, the vessel may not be on the water and may instead be on a trailer or boat lift, or in a boathouse or storage facility or dry stack. In such an embodiment, the foam may effectuate cooling of the cells and absorb heat energy therefrom.

This foam may have strong surface wetting properties to coat and insulate the exposed conductors and prevent water electrolysis. The foam may be designed to remain in a liquid state, such as to allow for water pumping or flushing through the pack to cool the cells following the foam injection step. In another embodiment, the foam may be a hardening foam that fills the enclosure and coats the contacts.

The battery decommissioning system may be configured to disperse a refrigerated foam with a dielectric refrigerant, or chemical agent to create an endothermic chemical reaction that converts a liquid to an inert gas to refrigerate the foam. The system may be configured to fill the enclosure with such a heat dissipating material to generate small closed-cell bubbles to fill the pack, coat the exposed internal contacts with an electrically insulating layer, provide rapid cooling of the battery cells, and potentially stop the thermal event based on the localized cooling of the cells experiencing a thermal event. To provide just one example, sodium bicarbonate and citric acid may be used to create small closed-cell bubbles in the battery enclosure. The resultant endothermic (heat absorbing) chemical reaction and liquid to gas phase change combine to instantly cool the battery cells by hundreds of degrees centigrade.

Upon detection of continued thermal propagation and detection that the pack is submerged, the injected foam or other heat dissipating material may be followed by pumping water up through the battery pack. The pumped water could then flush out the foam (particularly where the foam is configured to remain a liquid), along with gas and heat buildup, and may be performed until the pack is fully cooled and/or the stored electrical energy is mostly or fully dissipated.

Figure 14:
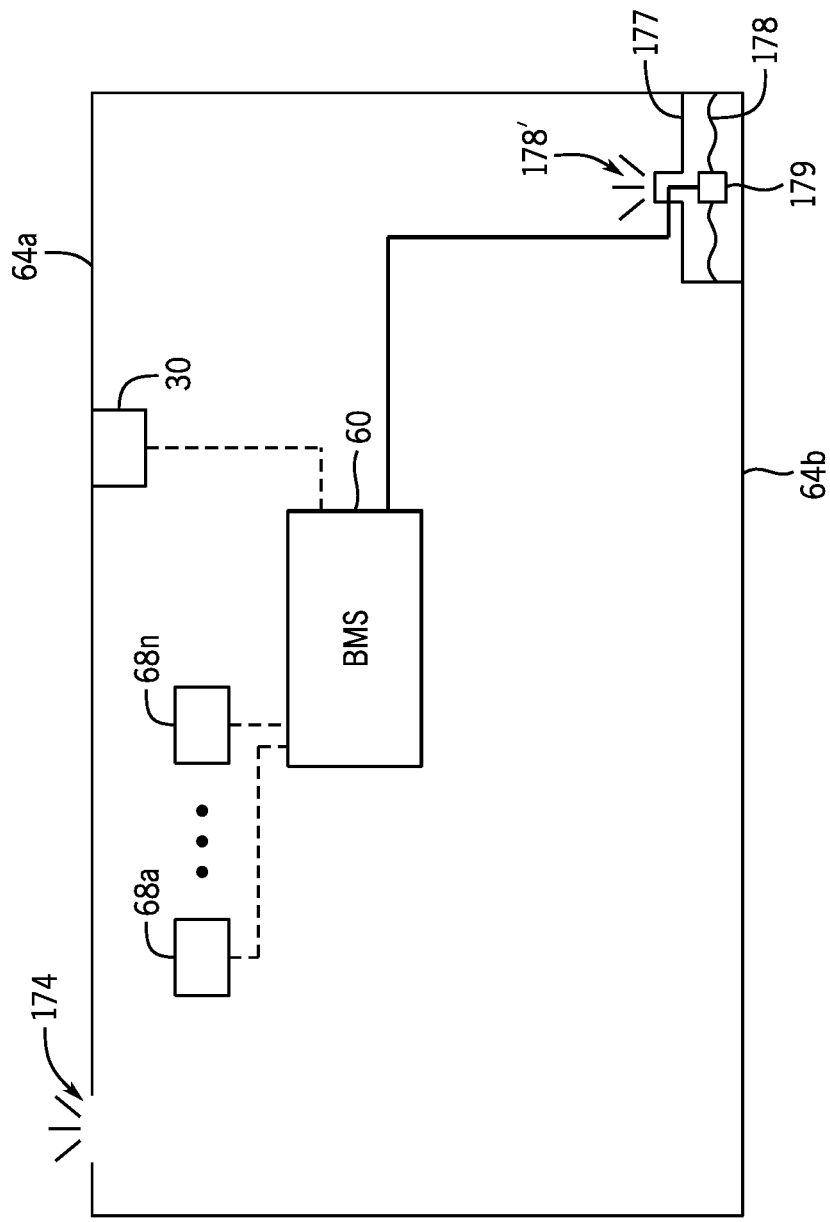
FIG. 14 is a is a diagram of a marine battery pack comprising a foam container according to another embodiment of the present disclosure.

FIG. 14 depicts an exemplary embodiment comprising a foam container 177 configured to release a foaming agent 178' into the cavity 63. For example, foam container 177 contains a liquid foam solution 178, such as maintained under pressure inside the container 177, configured to form foam as it is released therefrom. Foaming of the discharge dramatically increases the total volume of foam compared to the pressurized volume of foam solution 178 in the foam container 177. The foam container 177 may be a rigid container, such as formed of steel or other metal, configured to store and maintain the foam solution 178 under pressure. For example, the foam container 177 may be configured similar to one of several known fire extinguisher arrangements, such as a foam-type chemical fire extinguisher, and adapted for expelling foam into the cavity 23 of the battery pack.

The container 177 may be contained within the enclosure 64 or is otherwise plumbed to release the foaming agent 178' into the cavity. Releasing the foaming agent 178' into the cavity 63 is performed to stop battery cell heating, venting, decomposition, oxygen release, combustion, and potential thermal runaway. The chemical agents can be used to coat or cool the overheating cells.

As described above, the foaming agent 178' may be configured to generate an endothermic reaction to cool the cells. For example, the foaming agent 178' may include one of a known set of chemical foaming agents (CFAs), which will instantly chill any element in contact with the foaming agent 178'. For example, the endothermic reaction in combination with the liquid to vapor phase change may significantly reduce the temperature of a contact surface, such as by several hundred degrees Celsius.

The foam container 177 may be configured to release the foaming agent 178' over time to continually fill the cavity 63 with a flow of foam, such as to release a flow of foaming agent 178' for several minutes, for tens of minutes, or for longer. The enclosure 64 may include an outlet port 174 openable to permit the foaming agent 178' to flow out of the cavity 63 during that period. For example, the outlet port 174 may be openable by a port opening element 98 as described above. In another example, the outlet port 174 may be formed by expelling the gortex cover from the vent 74. For example, the outlet port 174 may be located on a side of the enclosure 64 opposite a side where the container 177 is positioned, thus causing the foam to flow through substantially all of the cavity 63. For example, the outlet port 174 may be on a top side 64a and the container 177 may be positioned near the bottom side 64b (which may be inside the cavity or outside the cavity and configured to release the foam into the cavity). Thus, a foam that remains in liquid/foam state may be be flowed over the cells and out of the outlet port 174 to cool the cells and arrest the thermal runaway occurring in the battery pack. A di-electric foam may be used to provide a fast-acting injection system without shorting the battery cell strings to the enclosure and enable pack repair by properly trained technicians.

In one embodiment, the foaming agent 178' is a sticky chemical foam (high surface adhesion) to coat the exposed electrical conductors in the pack to prevent electrolysis of ingress water. In one embodiment, this may be a hardening foam. In another embodiment, the foaming agent 178' remains liquid across a broad temperature range to enable flushing water through the pack after foam injection, such as via the pump 76 or by opening a plurality of ports as variously described above, to flush out the foam and continue cooling the battery cells.

In one embodiment, container 177 contains an inner cartridge 179 containing an activation agent. The activation agent is configured to cause the foam solution 178 to form the foaming agent 178'. To provide just one example, the foam solution 178 may be a sodium bicarbonate solution or otherwise contain sodium bicarbonate and the activation agent may be citric acid or an aluminum sulfate solution. Operating the foam container 177 to release the foaming agent includes causing the inner cartridge to release the activation agent to mix with the foam solution. Doing so may cause the foaming reaction, which may lead to the expulsion of the at least one foaming agent. Alternatively or additionally, the container 177 may have a valve or a nozzle thereon, such as a pressure valve configured to open, such as to break or otherwise permanently move to an open state, upon being subjected to a threshold pressure inside the container 177. Alternatively, the container 177 may have an actuatable valve or a nozzle, such as electronically controllable by the control module.

In one embodiment, the container 177 is controllable by the BMS 60 or SPM 82 to release the foam into the pack upon detection of an event, such as an event warranting decommissioning based on information from the interior sensor(s) 30 as described above. For example, the inner cartridge 179 may have a mechanism controllable by BMS 60 or SPM 82 to effectuate release of the activation agent to thereby initiate the generation and release of the foaming agent 178'.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art in view of the present disclosure. Such other examples are intended to be within the scope of the claims if they have features or structural elements that do not differ from the literal language of the claims, or if they include equivalent features or structural elements with insubstantial differences from the literal languages of the claims.

We claim:

1. A marine battery pack comprising:
   an enclosure defining a cavity;
   a plurality of cell modules within the cavity, each comprising a plurality of battery cells;

at least one sensor configured to sense at least one of a temperature, a pressure, a presence of water, and a gas content within the cavity;
a pump configured to intake water from a surrounding body of water outside the enclosure and pump the water throughout the cavity from an inlet port in the enclosure to an outlet port in the enclosure;
at least one power switch configured to selectively connect each of the plurality of cell modules to the pump so as to power the pump:
a controller configured to:
  detect an event warranting decommission of the battery pack based on the temperature, the pressure, the presence of water, and/or the gas content within the cavity;
  control the at least one power switch to connect the plurality of cell modules to the pump to power the pump; and
  in response to detecting the event warranting decommission of the battery pack, automatically operate the pump to intake water from the surrounding body of water outside the enclosure and pump the water throughout the cavity from the inlet port in the enclosure to the outlet port in the enclosure so as to cool the plurality of battery cells.

2. The marine battery pack of claim 1, wherein the controller is configured to detect immersion of the enclosure prior to operating the pump.

3. The marine battery pack of claim 2, further comprising at least one exterior sensor configured to sense at least one of an exterior temperature, an exterior pressure, and a presence of water on the exterior of the enclosure, and wherein the controller is configured to detect the immersion of the enclosure based on the at least one of the exterior temperature, the exterior pressure, and the presence of water on the exterior of the enclosure.

4. The marine battery pack of claim 1, wherein the controller is further configured to control the at least one power switch based on a temperature of each of the plurality of cell modules so as to disconnect any cell module having a temperature that exceeds a threshold temperature.

5. The marine battery pack of claim 1, wherein the controller is further configured to automatically operate at least one port opening element to open at least one of the inlet port and the outlet port.

6. The marine battery pack of claim 5, wherein the port opening element includes at least one of an electromechanical element and a pyrotechnic element configured to force an opening in the enclosure to open at least one of the inlet port and the outlet port.

7. The marine battery pack of claim 5, wherein the port opening element is a valve.

8. The marine battery pack of claim 1, wherein the inlet port is on a bottom half of the enclosure and the outlet port on a top half of the enclosure.

9. A marine battery pack comprising:
an enclosure defining a cavity;
a plurality of cell modules within the cavity, each comprising a plurality of battery cells;
at least one sensor configured to sense at least one of a temperature, a pressure, a presence of water, and a gas content within the cavity;
a pump configured to intake water from a surrounding body of water outside the enclosure and pump the water throughout the cavity from an inlet port in the enclosure to an outlet port in the enclosure;
a pump power source within the enclosure configured to power the pump, wherein the pump power source is a low voltage battery housed within the cavity that is not connectable to the plurality of cell modules;
a controller configured to:
  detect an event warranting decommission of the battery pack based on the temperature, the pressure, the presence of water, and/or the gas content within the cavity; and
  automatically operate the pump to intake water from a surrounding body of water outside the enclosure and pump the water throughout the cavity from an inlet port in the enclosure to an outlet port in the enclosure so as to cool the plurality of battery cells.

10. A method of controlling a marine battery pack containing a plurality of battery cells, the method comprising:
monitoring, with a controller, a temperature, a pressure, a presence of water, and/or a gas content within a cavity of an enclosure of the marine battery pack based on input from at least one sensor;
detecting, with the controller, an event warranting decommission of the battery pack based on the temperature, the pressure, the presence of water, and/or the gas content within the cavity;
wherein the battery pack comprises at least one power switch configured to selectively connect each of the plurality of cell modules to a pump so as to power the pump;
in response to detection of the event warranting decommission of the battery pack, automatically operating at least one power switch with the controller to selectively connect at least one of a plurality of cell modules in the battery pack to the pump so as to power the pump, and then operating the pump to intake water from outside the enclosure and pump the water through the cavity from the inlet port in the enclosure to the outlet port in the enclosure so as to cool the plurality of battery cells.

11. The method of claim 10, further comprising detecting immersion of the enclosure based on input from at least one exterior sensor on the enclosure prior to operating the pump to pump the water through the cavity.

12. The method of claim 11, wherein detecting the immersion of the enclosure includes detecting, via the at least on exterior sensor, at least one of a presence of water on an exterior of the battery enclosure, a threshold exterior pressure, a threshold exterior pressure change, and a threshold exterior temperature change.

13. The method of claim 11, further comprising detecting total immersion of the enclosure in water based on input from a plurality of external sensors prior to operating the pump to pump the water through the cavity.

14. The method of claim 10, wherein detecting the event warranting decommission includes detecting immersion of the enclosure for a threshold period of time.

15. The method of claim 10, further comprising controlling the at least one power switch to selectively connect at least two of the plurality of cell modules in parallel to power the pump.

16. The method of claim 10, further comprising controlling the at least one power switch based on a temperature of each of the plurality of cell modules so as to disconnect any cell module having a temperature that exceeds a threshold temperature from powering the pump.

17. The method of claim 10, further comprising, following detection of the event warranting decommission of the battery pack and prior to operating the pump, automatically operating at least one port opening element to open the inlet port of the enclosure or to open the outlet port of the enclosure.

18. The method of claim 17, wherein the at least one port opening element is an electromechanical element or a pyrotechnic element configured to force an opening in the enclosure, and wherein the method further comprises operating the opening element to force the opening in the enclosure to open the inlet port of the enclosure or to open the outlet port of the enclosure.

19. The method of claim 17, wherein the at least one port opening element is a valve, the method further comprising operating the valve with the controller to allow water to flow through the respective one of the inlet port and the outlet port.

\* \* \* \* \*